United States Patent

Takekasa

[11] Patent Number: 6,097,990
[45] Date of Patent: Aug. 1, 2000

[54] INPUT DEVICE TO INPUT CHARACTERS AND SYMBOLS FOR RECORDING CHARACTERS AND SYMBOLS ON A FILM

[76] Inventor: Hitoshi Takekasa, 1-18, Minamihancho Nishi 3-cho, Sakai-shi, Osaka 590, Japan

[21] Appl. No.: 08/945,199
[22] PCT Filed: Feb. 26, 1996
[86] PCT No.: PCT/JP96/00467
 § 371 Date: Mar. 10, 1998
 § 102(e) Date: Mar. 10, 1998
[87] PCT Pub. No.: WO96/33454
 PCT Pub. Date: Oct. 24, 1996

[30] Foreign Application Priority Data

Apr. 21, 1995 [JP] Japan .................................. 7-132542

[51] Int. Cl.[7] .............................. G09G 3/20; G08B 15/00
[52] U.S. Cl. ........................... 700/84; 396/299; 345/59
[58] Field of Search ................................. 700/56, 61, 66, 700/83, 84, 85; 396/299, 300; 345/59; 707/503, 509

[56] References Cited

U.S. PATENT DOCUMENTS 5,471,267 11/1995 Goto et al. .............................. 354/106

FOREIGN PATENT DOCUMENTS 41150124 6/1989 Japan .
11292419 11/1989 Japan .
2321128 3/1991 Japan .
35127246 5/1993 Japan .

*Primary Examiner*—Joseph E. Palys
*Assistant Examiner*—Bethew B. Jennings
*Attorney, Agent, or Firm*—Morrison Law Firm

[57] ABSTRACT

An input device by which a character or symbol is retrieved and determined using an irreducible minimum number of numeric keys 0, 1, 2, 3, 4, 5, 6, 7, 8, and 9 in an address reference table of an information exchange code main memory. Ten bits of data corresponding to a column index and ten bits of data corresponding to a row index are alternately inputted through an input keyboard. When a first arbitrary numeral is inputted, a column of characters corresponding to the input numeral is held in an ON state, and is simultaneously displayed on a selected character confirmation display. When a second arbitrary numeral is inputted, a row of characters corresponding to the input numeral is selected, and a single character corresponding to the selected column and row is placed in an ON state, and all other characters are placed in an OFF state. This input device is mounted on a camera, and a bitmap display of a line of characters is provided on a press plate of the camera. Character and symbol data are inputted through the input device, and information is recorded easily and in detail to any portion of one frame of a film.

7 Claims, 23 Drawing Sheets

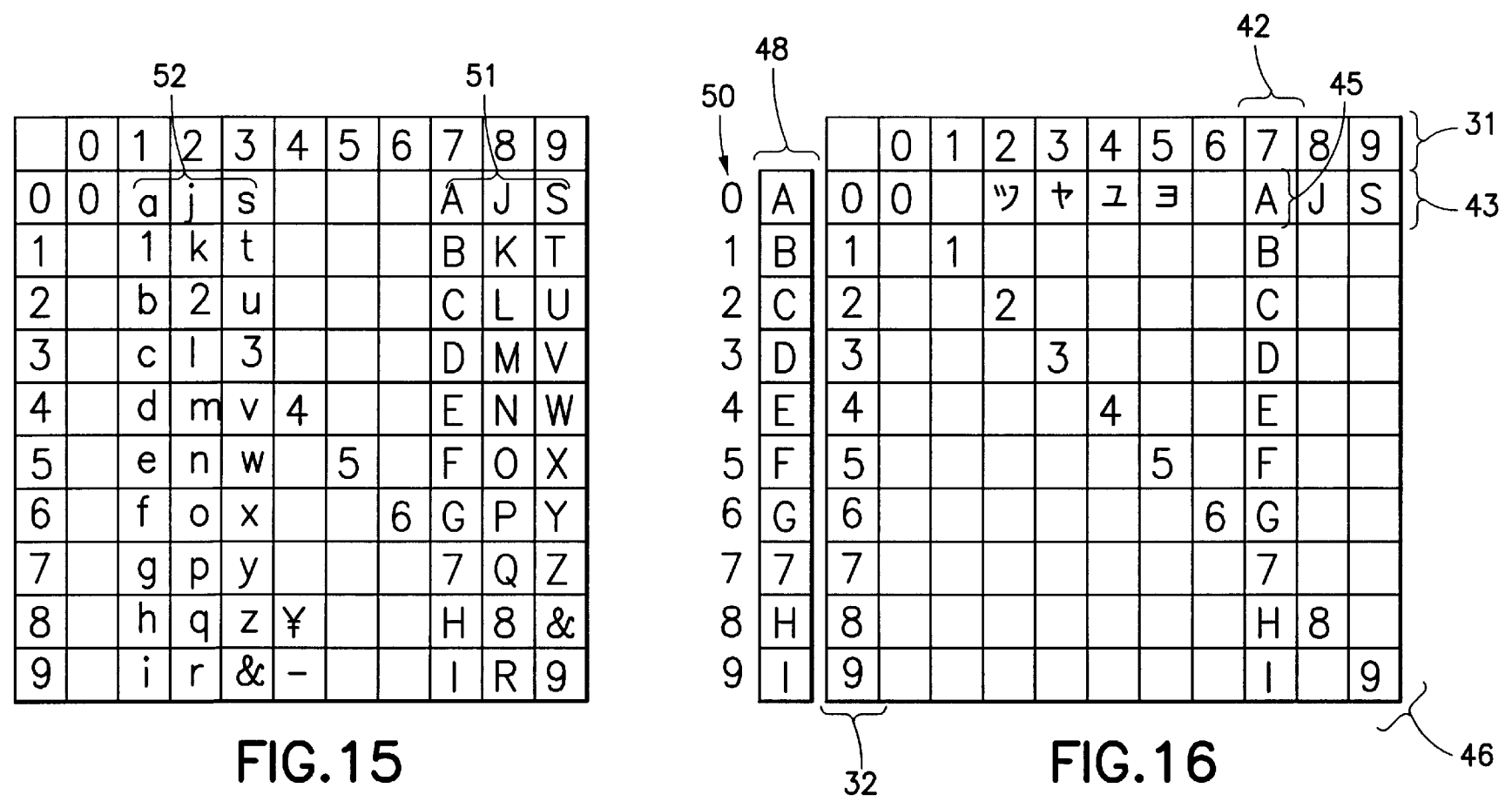

| | 0 | 1 | 2 | 3 | 4 | 5 | 6 | 7 | 8 | 9 |
|---|---|---|---|---|---|---|---|---|---|---|
| 9 | | | | | | | | S | | |
| 8 | | | | | | | | J | | |
| 7 | | | | | | | | A | B | C | D | E | F | G | H | I |
| 6 | | | | | | | 6 | | | |
| 5 | | | | | | 5 | | | | |
| 4 | | | | | 4 | | | | | |
| 3 | | | | 3 | | | | | | |
| 2 | | | 2 | | | | | | | |
| 1 | | 1 | | | | | | | | |
| 0 | 0 | | | | | | | | | |
| | 0 | 1 | 2 | 3 | 4 | 5 | 6 | 7 | 8 | 9 |
| | A | B | C | D | E | F | G | H | I | |

(row below: 0 1 2 3 4 5 6 7 8 9)

FIG. 15

| | 0 | 1 | 2 | 3 | 4 | 5 | 6 | 7 | 8 | 9 |
|---|---|---|---|---|---|---|---|---|---|---|
| 9 | | | | | | | | S | T | U | V | W | X | Y | Z | & |
| 8 | | | | | | | | J | K | L | M | N | O | P | Q | R |
| 7 | | | | | | | | A | B | C | D | E | F | G | H | I |
| 6 | | | | | | | 6 | | | |
| 5 | | | | | | 5 | | | | |
| 4 | | | | | 4 | | | | ¥ | – |
| 3 | | | s | t | u | 3 | v | w | x | y | z | & |
| 2 | | j | k | l | 2 | m | n | o | p | q | r |
| 1 | | a | 1 | b | c | d | e | f | g | h | i |
| 0 | 0 | | | | | | | | | |
| | 0 | 1 | 2 | 3 | 4 | 5 | 6 | 7 | 8 | 9 | ns
INPUT DEVICE TO INPUT CHARACTERS AND SYMBOLS FOR RECORDING CHARACTERS AND SYMBOLS ON A FILM

BACKGROUND OF THE INVENTION

This invention relates to an input device capable of inputting characters and symbols by using only numeric keys 0, 1, 2, 3, 4, 5, 6, 7, 8 and 9 of an input keyboard, and further to an apparatus applying said input device for recording characters, and symbols on a film.

Conventionally, it is known that an input device which electronically inputs characters and symbols, can be applied in an electronic apparatus such as a camera, an electronic diary etc. For example, in a camera which has the above-mentioned conventional input device, photographing information such as date, month, year, and some simple characters etc. can be recorded on a film, and besides, some sorts of words are previously memorized in the camera, so the words can be recorded on the film without writing in each of characters. However, in such a conventional manner, some predetermined words are memorized beforehand in the camera, and it is impossible to record arbitrary characters on any portion of a frame of a film, and besides, complicated operations are needed to input even a character.

OBJECTS AND SUMMARY OF THE INVENTION

Accordingly, an object of the present invention is to overcome the drawbacks and limitations of the prior art.

Another object of the present invention is to provide an input device for inputting character and symbol data in an electronic apparatus with a simple operation.

A further object of the present invention is to provide an input device that is mounted to a camera which can easily input arbitrary photographing information and record such information on a frame of film by a loading operation and a bitmap display of the camera.

It is a further object of the present invention to provide an input device in which an address reference table of an information exchange code main memory has a 10 bit row index and a 10 bit column index, where such row index and column index are alternately inputted by using an irreducible minimum number of numeric keys 0, 1, 2, 3, 4, 5, 6, 7, 8 and 9 which are arranged in an input keyboard, where both sets of 10 bit indexes have independent function.

Briefly stated, an input device by which a character or symbol is retrieved and determined using an irreducible minimum number of numeric keys 0, 1, 2, 3, 4, 5, 6, 7, 8, and 9 in an address reference table of an information exchange code main memory. Ten bits of data corresponding to a column index and ten bits of data corresponding to a row index are alternately inputted through an input keyboard. When a first arbitrary numeral is inputted, a column of characters corresponding to the input numeral is held in an ON state, and is simultaneously displayed on a selected character confirmation display. When a second arbitrary numeral is inputted, a row of characters corresponding to the input numeral is selected, and a single character corresponding to the selected column and row is placed in an ON state, and all other characters are placed in an OFF state. This input device is mounted on a camera, and a bitmap display of a line of characters is provided on a press plate of the camera. Character and symbol data are inputted through the input device, and information is recorded easily and in detail to any portion of one frame of a film. According to an embodiment of the present invention, an input device is applied to a camera having a press plate which is provided with a bitmap display of a line of characters, and pressed onto a film. The bitmap display in which zones for one character are arranged in the line, is basically arranged so as to be exposed in a bitmap display exposure zone on the spool chamber side of one frame of the film. The film is wound up by a film loading operation and an auto-loading mechanism, and photographing information is successively exposed on the frame of the film. Moreover, the bitmap display is provided on the whole press plate of the camera, and pressed onto the film, so the photographing information can be collectively exposed. In order to expose the photographing information on the film, a liquid crystal display (LCD) operation panel and the bitmap display are connected with each other by a pair of signal lines, and controlled by numeral input keys 0, 1, 2, 3, 4, 5, 6, 7, 8 and 9 which are arranged on an input keyboard. Moreover, it is needless to say that a CPU for controlling all of operations of the input device is provided, a battery is connected to a circuit including the CPU, and the CPU is into operating conditions when a switch is in an ON state.

The numeral input keys 0, 1, 2, 3, 4, 5, 6, 7, 8 and 9 are arranged in the input keyboard. In the address reference table (FIG. 9) of the information exchange code main memory, a column index has 10 bits 0, 1, 2, 3, 4, 5, 6, 7, 8 and 9 which are arranged from the left, and a row index has 10 bits 0, 1, 2, 3, 4, 5, 6, 7, 8 and 9 which are arranged from the top.

In the address reference table (FIG. 9) of the information exchange code main memory, 10 bits 0, 1, 2, 3, 4, 5, 6, 7, 8 and 9 of the column index and 10 bits 0, 1, 2, 3, 4, 5, 6, 7, 8 and 9 of the row index are alternately inputted. Both of these 10 bits have basically independent function.

When an arbitrary numeral is inputted through the input keyboard, a column which corresponds to the inputted numeral of the column index is preferentially inputted in the address reference table (FIG. 9) of the information exchange code main memory, and held in an ON state, and the column is simultaneously displayed on the selected character confirmation display (48) shown in FIG. 2. Next, when another arbitrary numeral is inputted through the input keyboard, a row which corresponds to the inputted numeral of the row index is inputted. Only a character at intersection of the column which is preferentially inputted, held in an ON state, and displayed on the selected character confirmation display (48) shown in FIG. 2, and the row, is determined in an ON state and the others are turned off.

In the address reference table (FIG. 9) of the information exchange code main memory, in order to determine a figure by only one operation, figures 0, 1, 2, 3, 4, 5, 6, 7, 8 and 9 are assigned at intersection of same numerals of 10 bits 0, 1, 2, 3, 4, 5, 6, 7, 8 and 9 of the column index and the row index.

When a figure is selected, the figures 0, 1, 2, 3, 4, 5, 6, 7, 8 and 9 which are memorized at intersection of same numerals of the column index and the row index, are previously held in an ON state, displayed on the selected character confirmation display (48) shown in FIG. 2, and at the same time, the preferential input of a row is canceled. Next, when an arbitrary numeral is inputted through the input keyboard, only a figure which corresponds to the inputted numeral is determined in an ON state, and the others are turned off. The CPU for controlling all of operations in the input device is connected, and distinguishes the figures.

In the address reference table (FIG. 9) of the information exchange code main memory, 5-digit binary numeral represented as a series of 5 bits is memorized in each of 10 bits 0, 1, 2, 3, 4, 5, 6, 7, 8 and 9 of the column index, and 5-digit binary numeral represented as a series of 5 bits is memorized in each of 10 bits 0, 1, 2, 3, 4, 5, 6, 7, 8 and 9. The CPU which controls all of operations in the device, distinguishes the binary numeral and converts the binary numeral into a decimal numeral by that a signal passes through the 5-digit binary numeral represented as a series of 5 bits.

Ten bits of 0, 1, 2, 3, 4, 5, 6, 7, 8 and 9 of the column index and 10 bits of 0, 1, 2, 3, 4, 5, 6, 7, 8 and 9 of the row index in the address reference table (FIG. 9) of the information exchange code main memory which are connected to the input keyboard, are inputted alternately, and they basically functions independently, so arbitrary characters and symbols can be selected, and easily inputted through a combination of the numeral input keys 0, 1, 2, 3, 4, 5, 6, 7, 8 and 9 which are arranged in the input keyboard.

Moreover, the input device of the present invention can be mounted to various kinds of electronic products such as telephone, portable telephone, conversation apparatus for handicapped people (mainly the blind, deaf, or dumb), dictionary/translation apparatus, electronic diary and some products such as personal computer for converting figures into characters. The address reference table (FIG. 9) of the information exchange code main memory can be applied to various kinds of languages.

BRIEF DESCRIPTION OF THE DRAWINGS

FIG. 13 is an explanatory view showing figures 0, 1, 2, 3, 4, 5, 6, 7, 8 and 9 memorized in the address reference table (FIG. 9) of the information exchange code main memory.

FIG. 14 is an explanatory view showing figures 0, 1, 2, 3, 4, 5, 6, 7, 8 and 9 memorized in the address reference table (FIG. 10) of the information exchange code main memory.

FIG. 15 is a view showing an address reference table, corresponding to the address reference table (34) of FIG. 9 in which both of 10 bits of the column index and the row index are arranged from 0 to 9, wherein the alphabet (Latin letters) is displayed, and capital letters and small letters are shown.

FIG. 16 is a view for explaining in detail what is claimed in claim 1 and claim 2:

DETAILED DESCRIPTION OF THE PREFERRED EMBODIMENT OF THE PRESENT INVENTION

Figure 1:
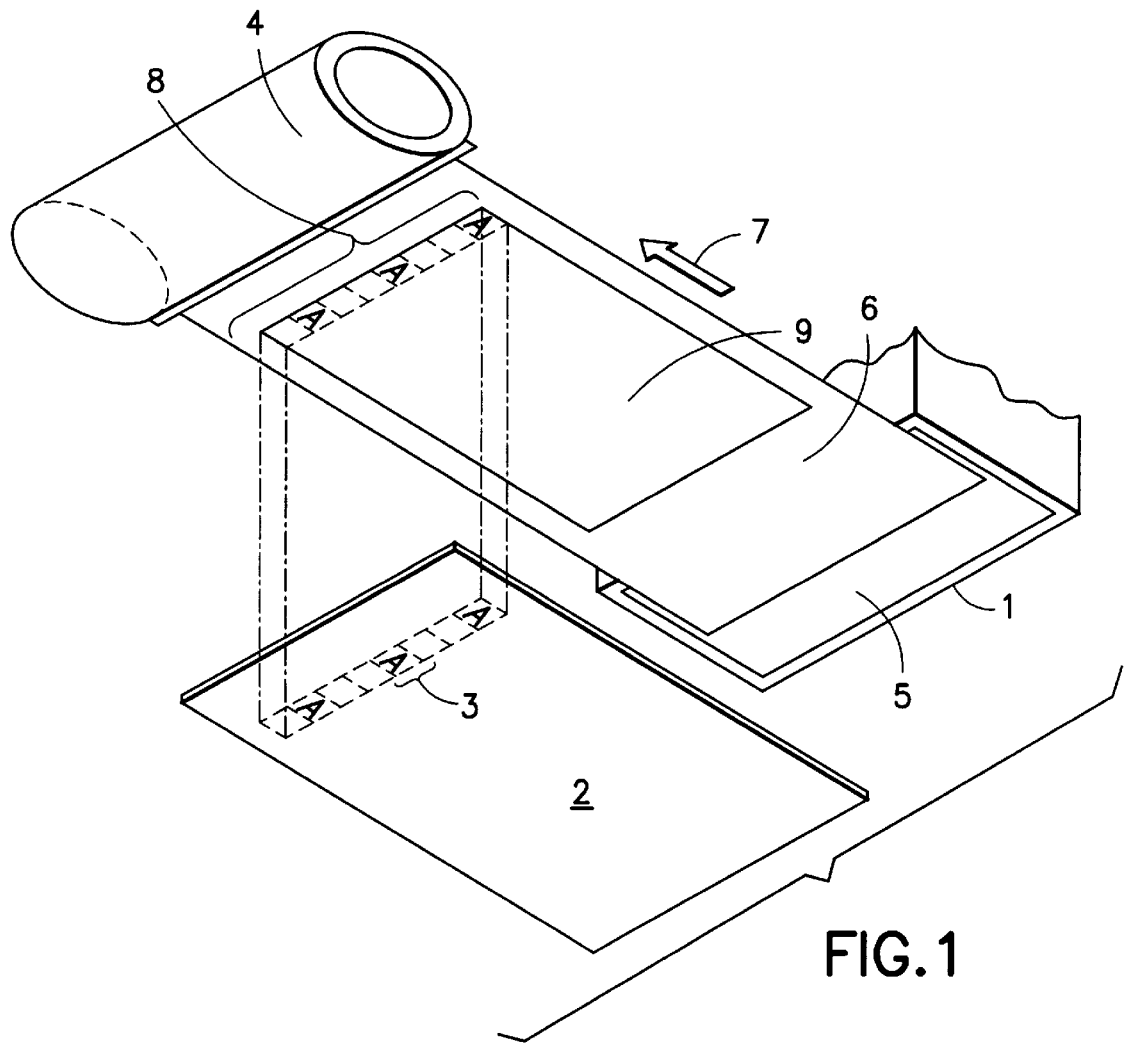
FIG. 1 is a perspective view showing a device for recording characters on a frame of a film in accordance with a preferred embodiment of the present invention.

A first embodiment of the present invention will be now described in the following with reference to the appended drawings. In the present embodiment, an input device of the present invention is embodied in an apparatus for recording characters on a film frame. FIG. 1 is a perspective view of the above-mentioned apparatus, wherein a column of a bitmap display is provided on the spool chamber side of a press plate (2). When an arbitrary character is selected in a state that a film (6) is loaded in a camera body (1), photographing information can be recorded on a bitmap display exposure zone (8) of the film (6) on winding the film (6) by one frame into a spool chamber (4) in a film winding direction (7) after a film frame (9) is photographed.

Figure 2:
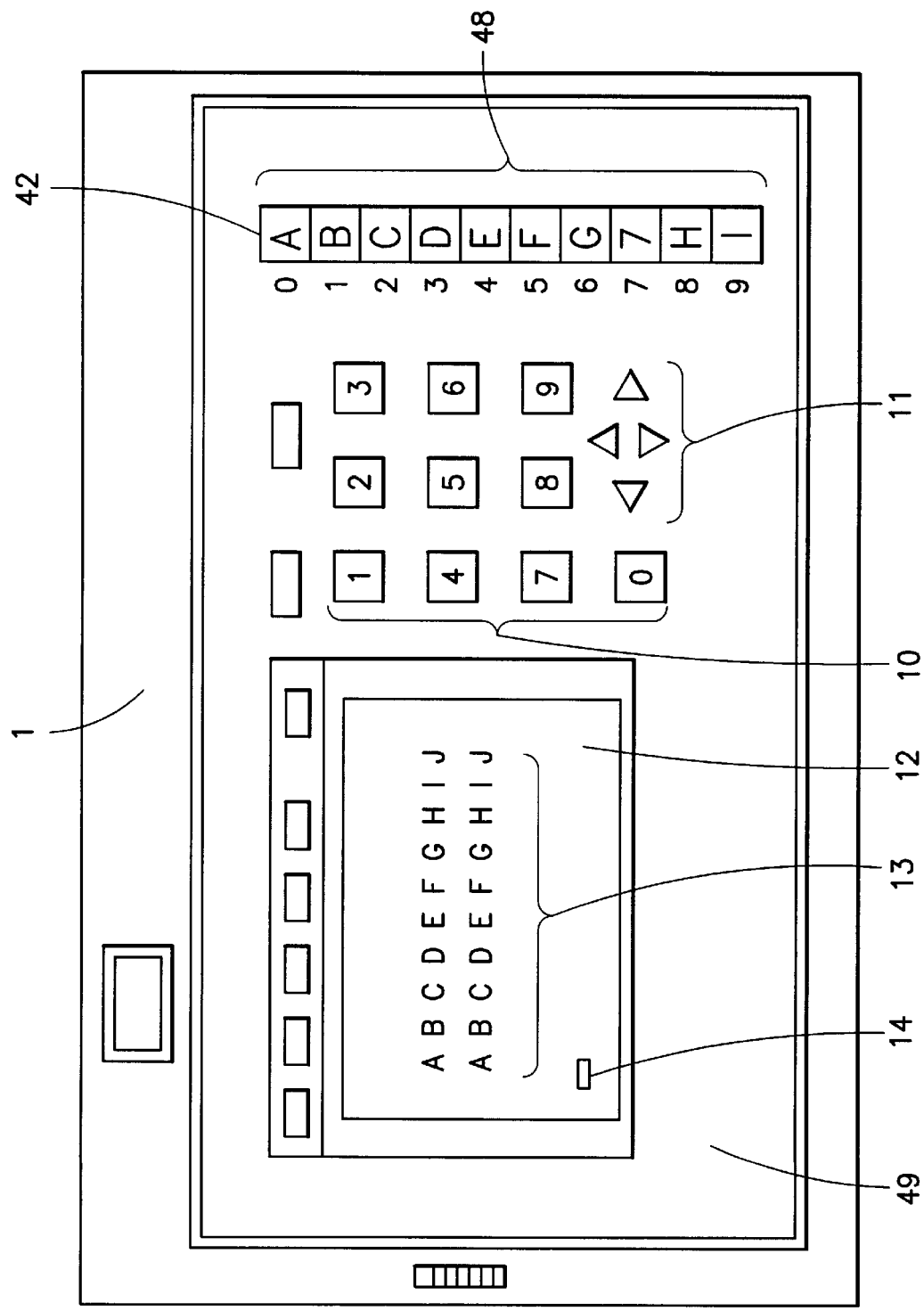
FIG. 2 is a plan view showing a general structure inside a back lid of the above-mentioned device.

FIG. 2 is a view showing a general structure inside a back lid of the camera employing the input device of the present invention, wherein an input keyboard (10) having numeral input keys 1, 2, 3, 4, 5, 6, 7, 8, 9 and 0, and a LCD operation panel (12) are arranged. When an arbitrary numeral is inputted through the input keyboard (10), a column that corresponds to the inputted arbitrary numeral of the column index in a later-described address reference table (34) (refer to FIG. 9), is first inputted preferentially, and it is simultaneously displayed in an ON state on a selected character confirmation display (48). Next, when another arbitrary numeral is inputted, a row that corresponds to the inputted arbitrary numeral in the row index, is inputted, only the character at intersection of the inputted column and row is definitely in an ON state, and the others are turned off. The character determined as described above is displayed on a liquid crystal display LCD operation panel (12) (hereinafter referred to as LCD operation panel). The bitmap display (3) provided on the press plate (2) is basically arranged in a line, and connected with a signal line, so the numeral input keys 0, 1, 2, 3, 4, 5, 6, 7, 8 and 9 in the input keyboard (10) can control characters.

Figure 3:
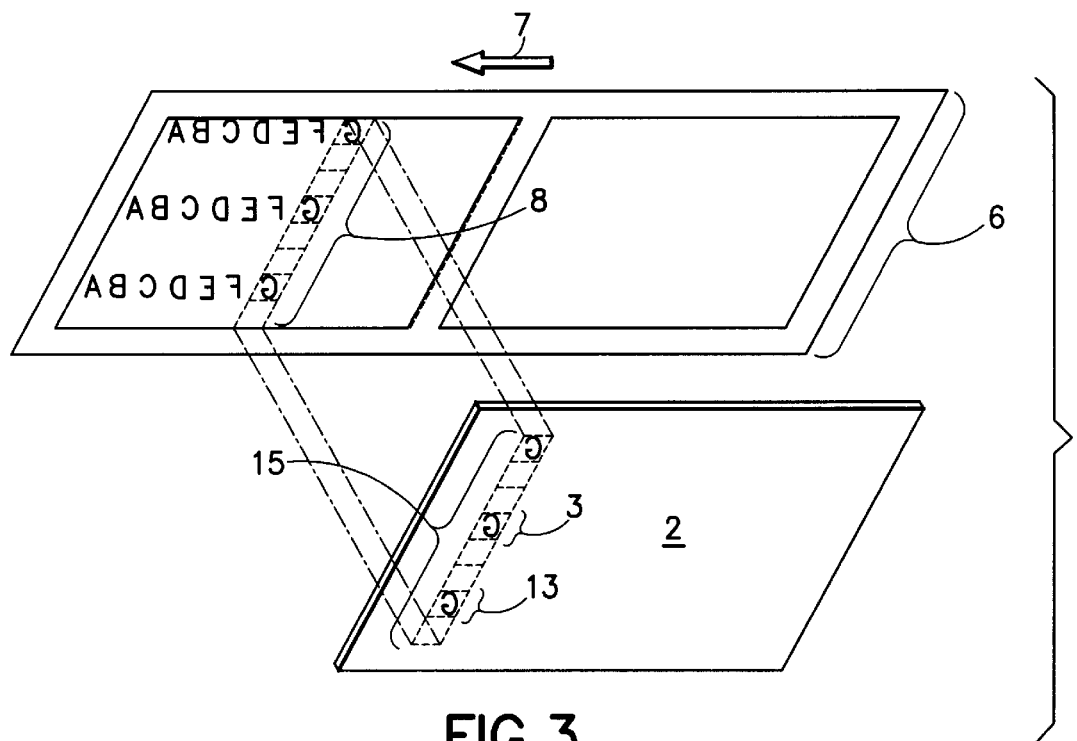
FIG. 3 is an explanatory view showing a method for recording characters In a film frame in accordance with the present invention.

FIG. 3 is a view showing a method for recording characters in a film frame in the above embodiment, A photographer selects an arbitrary character (13) in a state that a bitmap display (15) of a line of characters is provided on a press plate (2). Photographing information can be recorded on a bitmap display exposure zone (8) of a film frame on winding a film (6) by one frame in a film winding direction (7) after the film frame is photographed.

Figure 4:
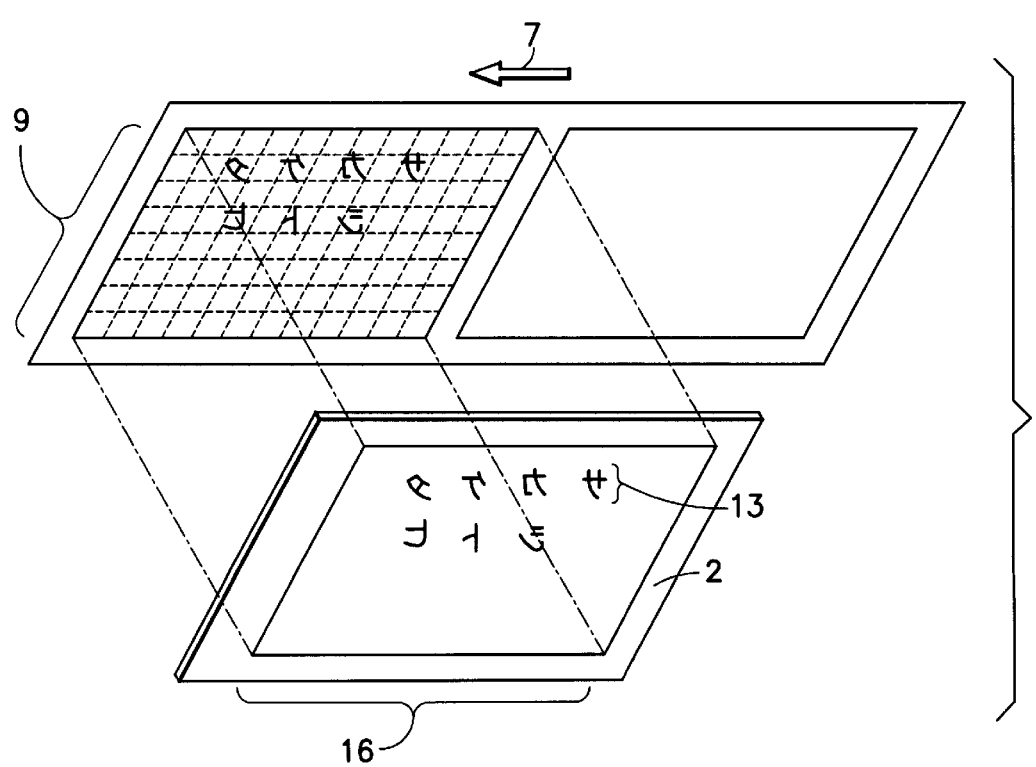
FIG. 4 is an explanatory view showing a method for exposing plural characters on any portion of a frame.

FIG. 4 is a view showing a method for exposing plural characters on any portion of film frames. A photographer selects arbitrary characters (13) in a state that the bitmap display (16) is provided on a whole press plate (2), and then, the characters (13) are collectively recorded on the exposure zone (9) of a film frame after the frame is photographed.

Figure 5:
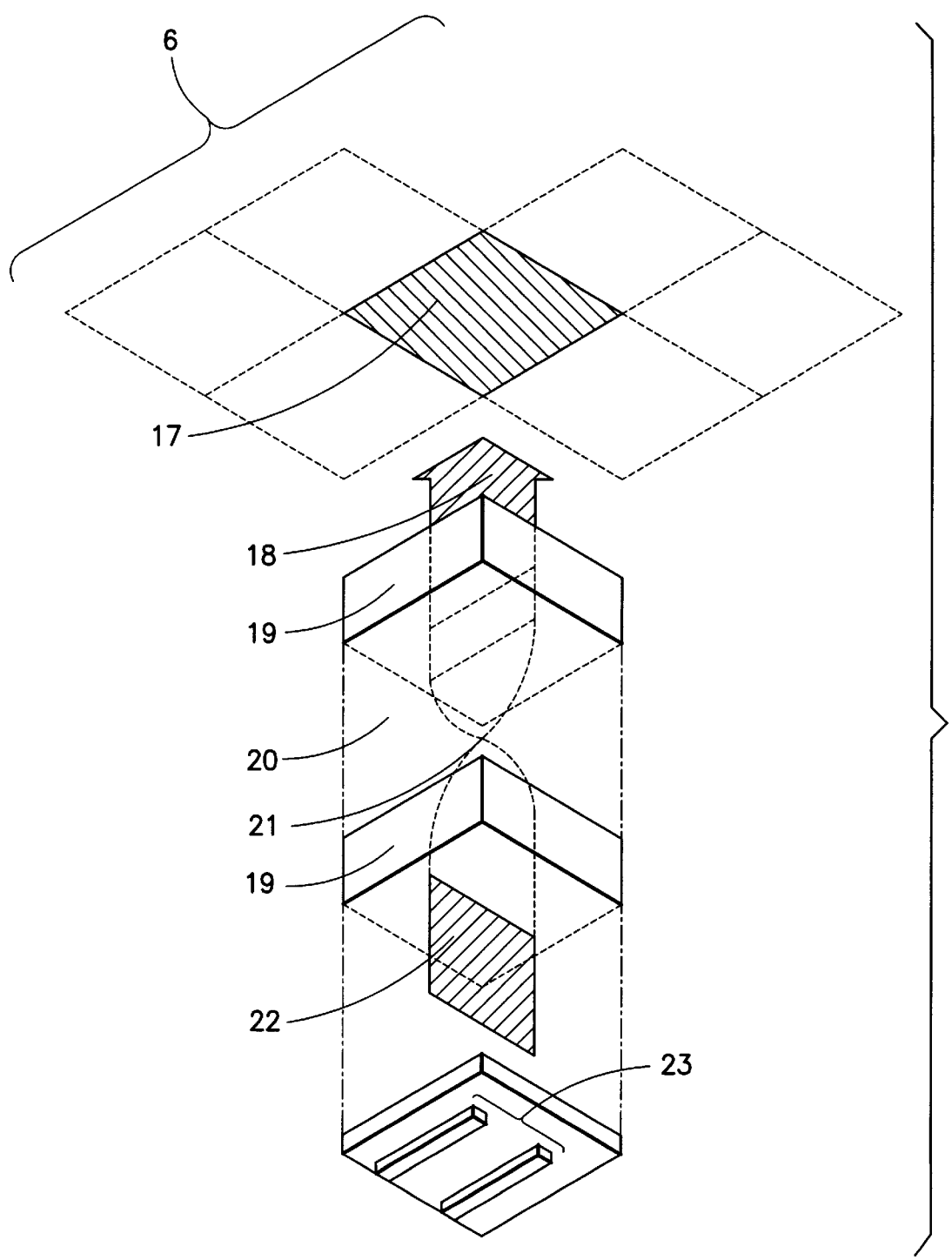
FIG. 5 is a principle exploded view showing a pixel on a glass board of a bitmap display, and an exposure zone of a frame.

FIG. 5 is an exploded view showing a pixel on a glass board of a bitmap display, and a bitmap display (3) provided on a press plate (2) of a film exposure zone. Light from a back-light (23) passes through a liquid crystal cell (19). After that, the light (22) twists 90 degrees on passing through liquid crystal material (20), and then passes through another liquid crystal cell (19). Passing-through light (18) exposes an exposed zone (17) of the film (6).

Figure 6:
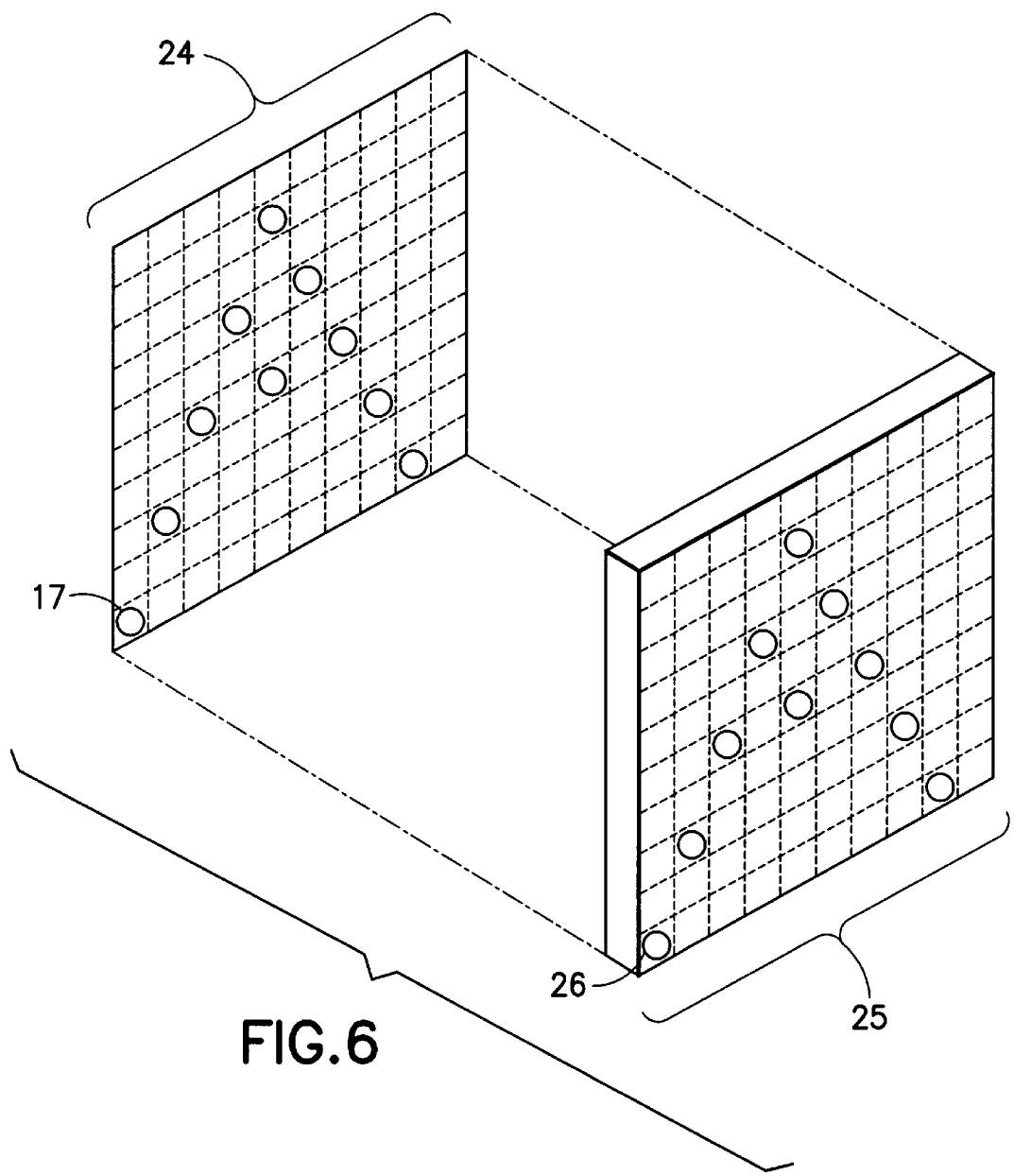
FIG. 6 is a perspective view of an arbitrary character in a bitmap display of 100 pixels.

FIG. 6 is a perspective view of an arbitrary character in a bitmap display of 100 pixels. As shown in the figure, the bitmap display has a zone (25) for one character consisting of 100 pixels (26), and the film frame has an exposure zone (24) consisting of 100 exposed zones (17) on which the pixels (26) are exposed. When an arbitrary character "A" is selected, the pixels (26) for displaying "A" in the zone (25) are in an ON state, and then, the exposed zones (17) that correspond to the pixels (26), are exposed.

Figure 7:
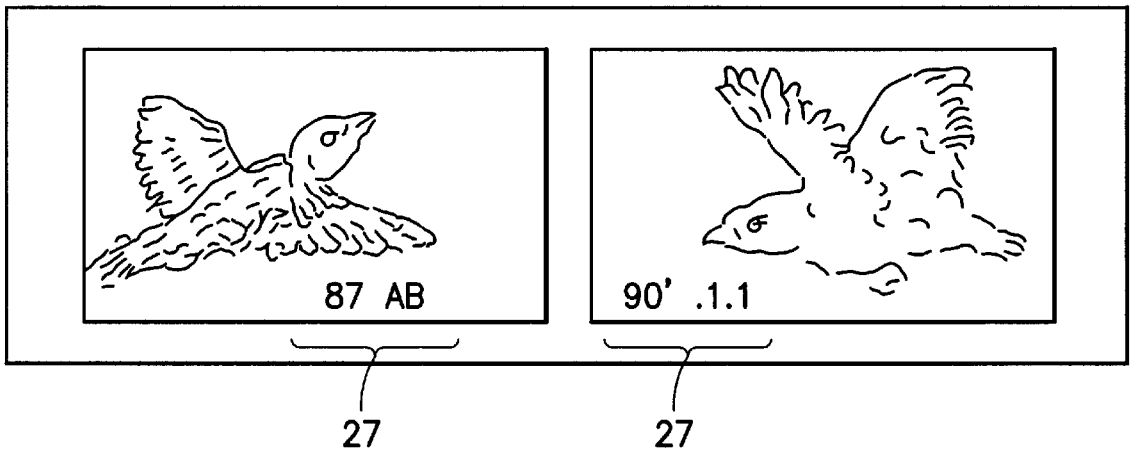
FIG. 7 is an explanatory view showing film frames in which caracters are exposed in a conventional method.

FIG. 7 is a view showing an example that characters are exposed on film frames in a conventional method. Restricted characters (27) are recorded on a predetermined portion of a film frame in a conventional manner.

Figure 8:
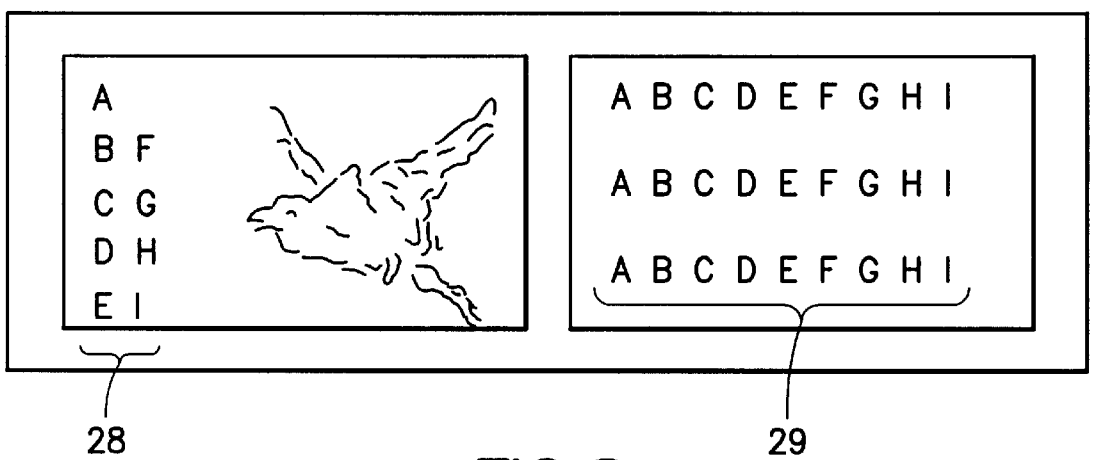
FIG. 8 is an explanatory view showing film frames in which characters are exposed on any portion thereof in accordance with the present invention.

FIG. 8 is a view showing two examples that characters are exposed on film frames in accordance with the present invention. One of these film frames is provided with arbitrary characters (28) recorded on an arbitrary portion thereof, and the other of these film frames is provided with arbitrary characters (29) recorded on the whole frame thereof.

Figure 9:
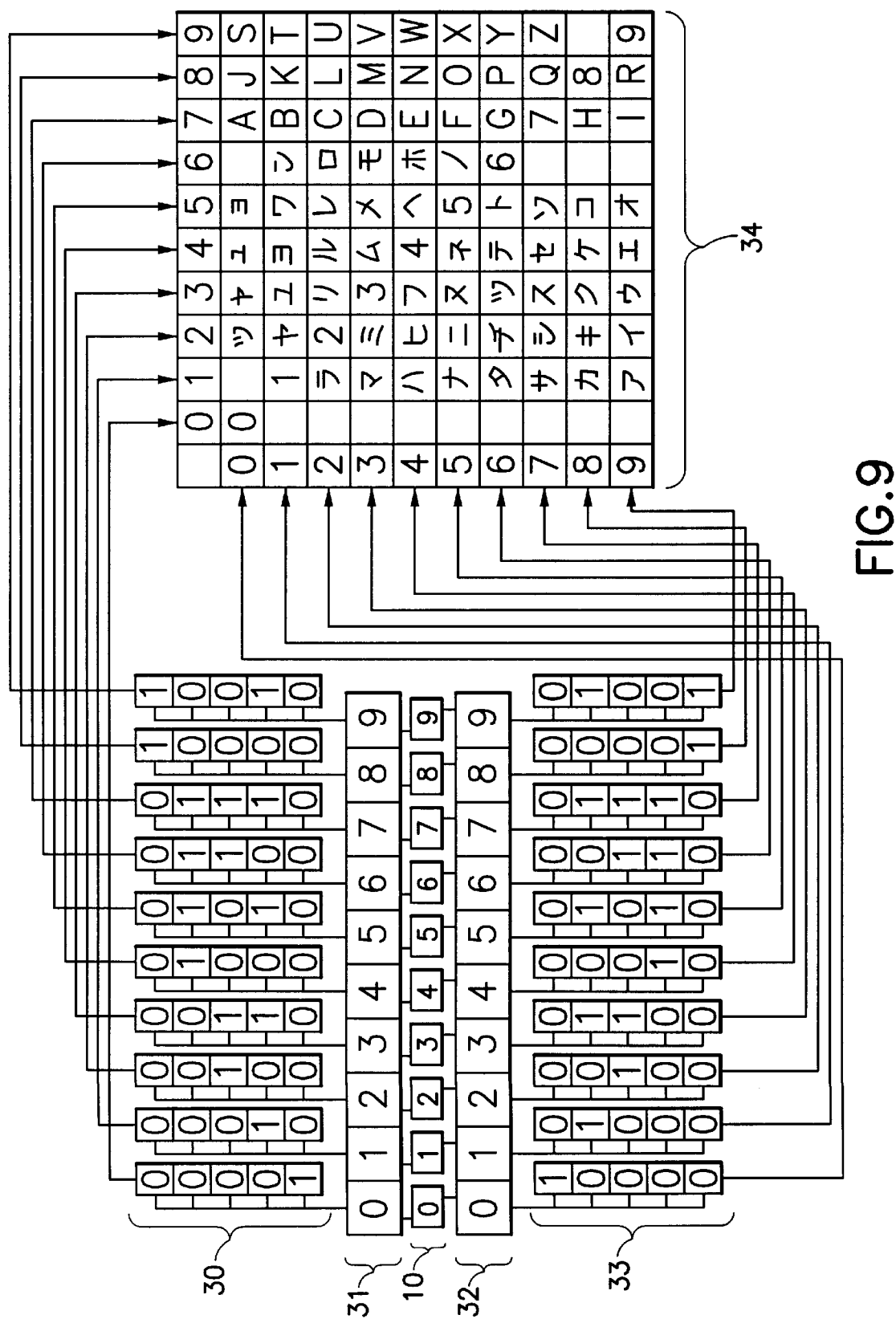
FIG. 9 is an explanatory view showing a usage method of address reference table of an information exchange code main memory in the present embodiment, wherein both of the column index and row index are arranged from 0 to 9.

FIG. 9 is a view showing an address usage method in the case that both of 10 bits of a column index and a row index are arranged from 0 to 9 in an address reference table (34) of an information exchange code main memory.

In an address reference table (FIG. 9) of an information exchange code main memory, 10 bits (31) of 0, 1, 2, 3, 4, 5, 6, 7, 8 and 9 of the column index are arranged from the left, and 10 bits (32) of 0, 1, 2, 3, 4, 5, 6, 7, 8 and 9 of the row index are arranged from the top. Said 10 bits (31) of 0, 1, 2, 3, 4, 5, 6, 7, 8 and 9, and said 10 bits (32) of 0, 1, 2, 3, 4, 5, 6, 7, 8 and 9 are inputted alternately, and they have basically independent function.

When an arbitrary numeral is inputted through the input keyboard (10), a column which corresponds to the inputted numeral among 10 bits (31) 0, 1, 2, 3, 4, 5, 6, 7, 8 and 9 of the column index, is preferentially inputted, and held in an ON state, and the column is simultaneously displayed on the selected character confirmation display (48). Next, when another arbitrary numeral is inputted, a row which corresponds to the inputted numeral among 10 bits (32) 0, 1, 2, 3, 4, 5, 6, 7, 8 and 9 of the row index is inputted. Only a character at intersection of the column which is preferentially inputted, held in an ON state, and displayed on the selected character confirmation display (48), and the row is determined in an ON state and the others are turned off. Further, it is possible to input the column and the row in reverse order to the above-mentioned order.

In order to determine a figure by only one operation, figures 0, 1, 2, 3, 4, 5, 6, 7, 8 and 9 are assigned at intersection of same numerals of 10 bits 0, 1, 2, 3, 4, 5, 6, 7, 8 and 9 of the column index and the row index.

When a figure is selected, the figures 0, 1, 2, 3, 4, 5, 6, 7, 8 and 9 which are memorized at intersection of same numerals as the column index and the row index, are previously held in an ON state, and displayed on the selected character confirmation display (48), and at the same time, the preferential input of a row is canceled. Next, when an arbitrary numeral is inputted through the input keyboard, only a figure which corresponds to the inputted numeral is determined in an ON state, and the others are turned off. The CPU for controlling all of operations in the input device is connected, and distinguishes the figures.

In the address reference table (FIG. 9) of the information exchange code main memory, 5-digit binary numeral represented as a series of 5 bits is memorized in each of 10 bits 0, 1, 2, 3, 4, 5, 6, 7, 8 and 9 of the column index, and 5-digit binary numeral represented as a series of 5 bits is memorized in each of 10 bits 0, 1, 2, 3, 4, 5, 6, 7, 8 and 9. The CPU which controls all of operations in the device, distinguishes the binary numeral and converts the binary numeral into a decimal numeral by that a signal passes through the 5-digit binary numeral represented as a series of 5 bits.

Figure 10:
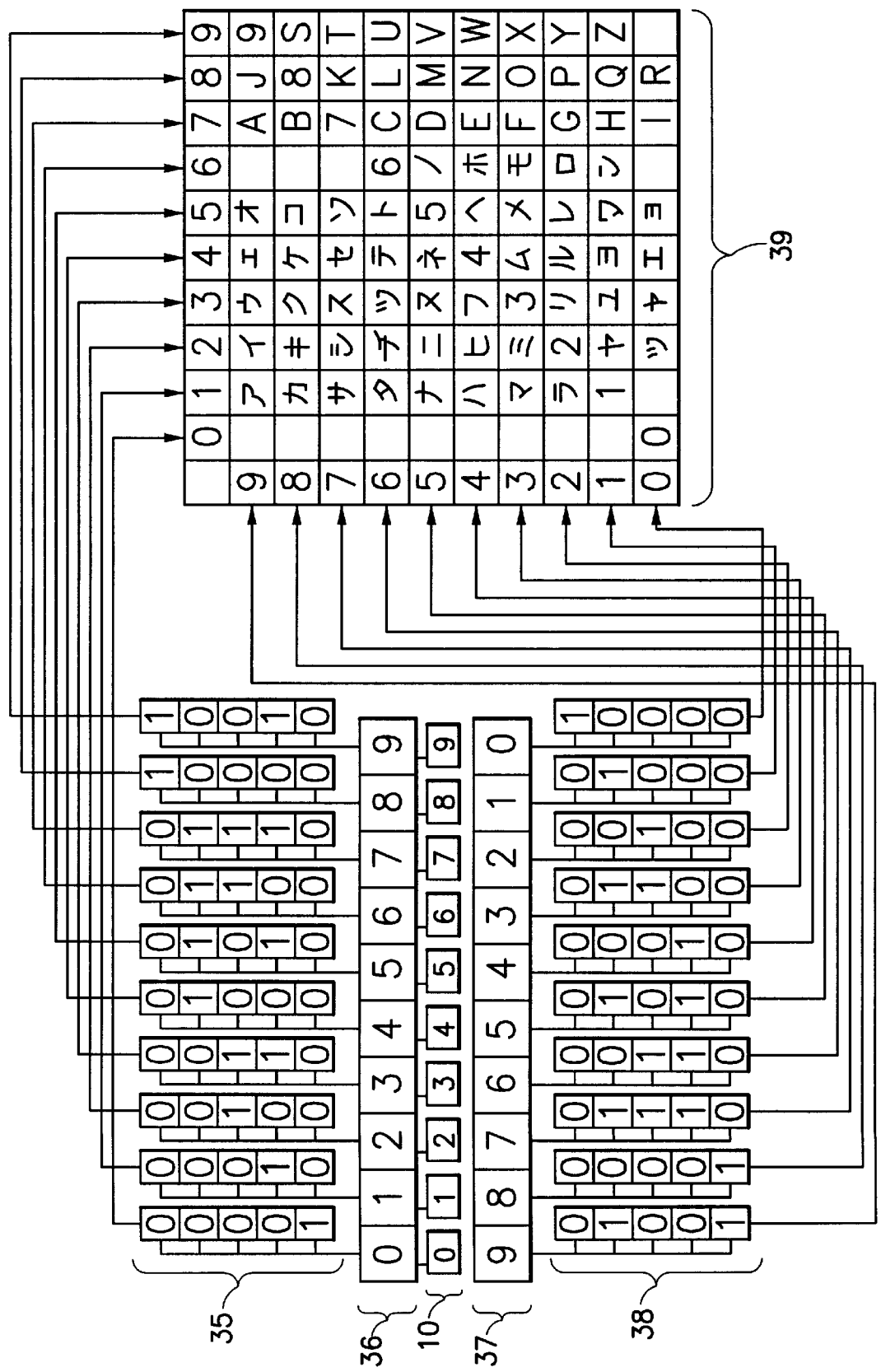
FIG. 10 is an explanatory view showing a usage method of address reference table of an information exchange code main memory in another embodiment of the present invention, wherein the column index are arranged from 0 to 9, and the row index are arranged backward from 9 to 0.

FIG. 10 is a view showing a modified embodiment wherein 10 bits (from 0 to 9) of the column index are arranged from the left, and 10 bits (backward from 9 to 0) of the row index are arranged from the top in an address reference table which is memorized in an information exchange code main memory.

Figures 11, 12:
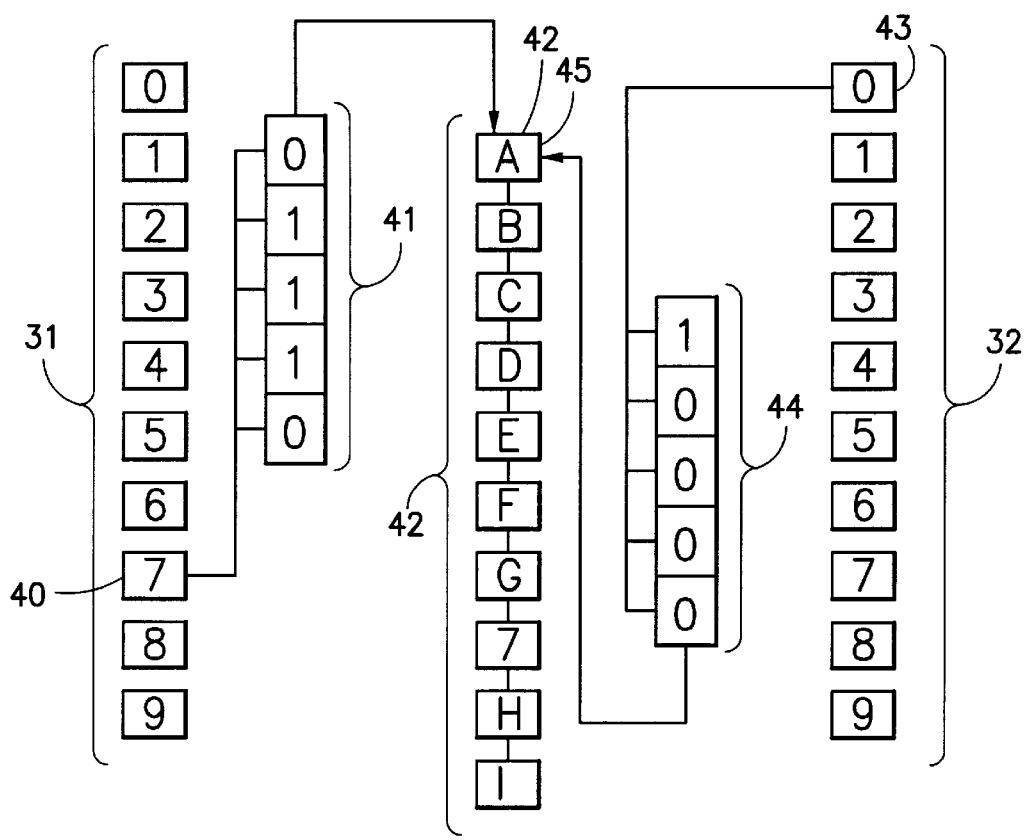
FIG. 11 is an explanatory view showing a method for selecting an arbitrary character "A" in an address reference table (FIG. 9) of the information exchange code main memory (refer to FIGS. 9 and 12).
FIG. 12 is an explanatory view showing a state that a column of characters and a row of characters are indicated in the address reference table of the information exchange code main memory shown in FIG. 9, and a character "A" is selected and determined in an on state.

FIG. 11 shows an example in which an arbitrary character "A" is selected (refer to FIGS. 2, 9 and 12).

When "7" is inputted through the input keyboard (10), 10 bits (31) 0, 1, 2, 3, 4, 5, 6, 7, 8 and 9 of the column index is preferentially inputted, and a signal is transmitted to the arbitrary numeral "7". The transmitted signal passes through a binary numeral "01110" in which a 5-digit binary numeral (30) (represented as a series of 5 bits) of the column index is memorized. Therefore, the CPU for controlling all of operations in the input device converts the binary numeral "01110" into a decimal numeral "7", and distinguishes it. The signal which has been converted into the decimal numeral, selects "7" of the column index in the address reference table (FIG. 9) of the information exchange code main memory, and a corresponding column of characters (42) "A, B, C, D, E, F, G, 7, H and I" is held in an ON state, and it is simultaneously displayed on a selected character confirmation display (48). Next, when "0" is inputted through the input keyboard (10) (43 in the figure), a signal is transmitted to the arbitrary numeral "0" of 10 bits (32) of 0, 1, 2, 3, 4, 5, 6, 7, 8 and 9 of the row index. The transmitted signal passes through a binary numeral "10000" in which a 5-digit binary numeral (33) (represented as a series of 5 bits) is memorized. Therefore, the CPU for controlling all of operations in the input device converts the binary numeral "10000" into a decimal numeral "0", and distinguishes it. The signal which has been converted into the decimal numeral, selects the arbitrary numeral "0" of the row index in the address reference table (FIG. 9) of the information exchange code main memory, and so a corresponding row of characters "0, □, ッ, ャ, ュ, ョ, □, A, J and S" is inputted. Then the character "A" at intersection of the inputted row of characters "0, □, ッ, ャ, ュ, ョ, □, A, J and S" and the previously displayed column of characters "A, B, C, D, E, F, G, 7, H and I" is definitely in an ON state, and the others are turned off.

FIG. 12 is a view showing the address reference table shown in FIG. 9 which is memorized in the information exchange code main memory in the case of selecting an arbitrary character "A". When an arbitrary numeral ("7" in this case) is inputted, and "7" of the column index in the reference table is selected, a corresponding column of characters "A, B, C, D, E, F, G, 7, H and I" is held in an ON state, and so it is simultaneously displayed on the selected character confirmation display (48). Next, when another arbitrary numeral ("0" in this case) is inputted, and "0" of the row index is selected, a corresponding row of characters "0, □, ッ, ャ, ュ, ョ, □, A, J and S" is inputted. The selected character "A" at intersection of the previously displayed column "A, B, C, D, E, F, G, 7, H and I" and the row "0, □, ッ, ャ, ュ, ョ, □, A, J and S" is definitely in an ON state, and the others are turned off.

FIG. 13 is a view showing figures 0, 1, 2, 3, 4, 5, 6, 7, 8 and 9 which are memorized in the address reference table (FIG. 9) of the information exchange code main memory.

In order to determine a figure efficiently by only one operation, the figures 0, 1, 2, 3, 4, 5, 6, 7, 8 and 9 are assigned at intersection of same numerals of 10 bits 0, 1, 2, 3, 4, 5, 6, 7, 8 and 9 of the column index and the row index.

When a figure is selected, the figures 0, 1, 2, 3, 4, 5, 6, 7, 8 and 9 which are memorized at intersection of same numerals as the column index and the row index, are previously held in an ON state, displayed on the selected character confirmation display (48) shown in FIG. 2, and at the same time, the preferential input of a row is canceled. Next, when an arbitrary numeral is inputted through the input keyboard, only a figure which corresponds to the inputted numeral is determined in an ON state, and the others are turned off. The CPU for controlling all of operations in the input device is connected, and distinguishes the figures.

Figures 13, 14:
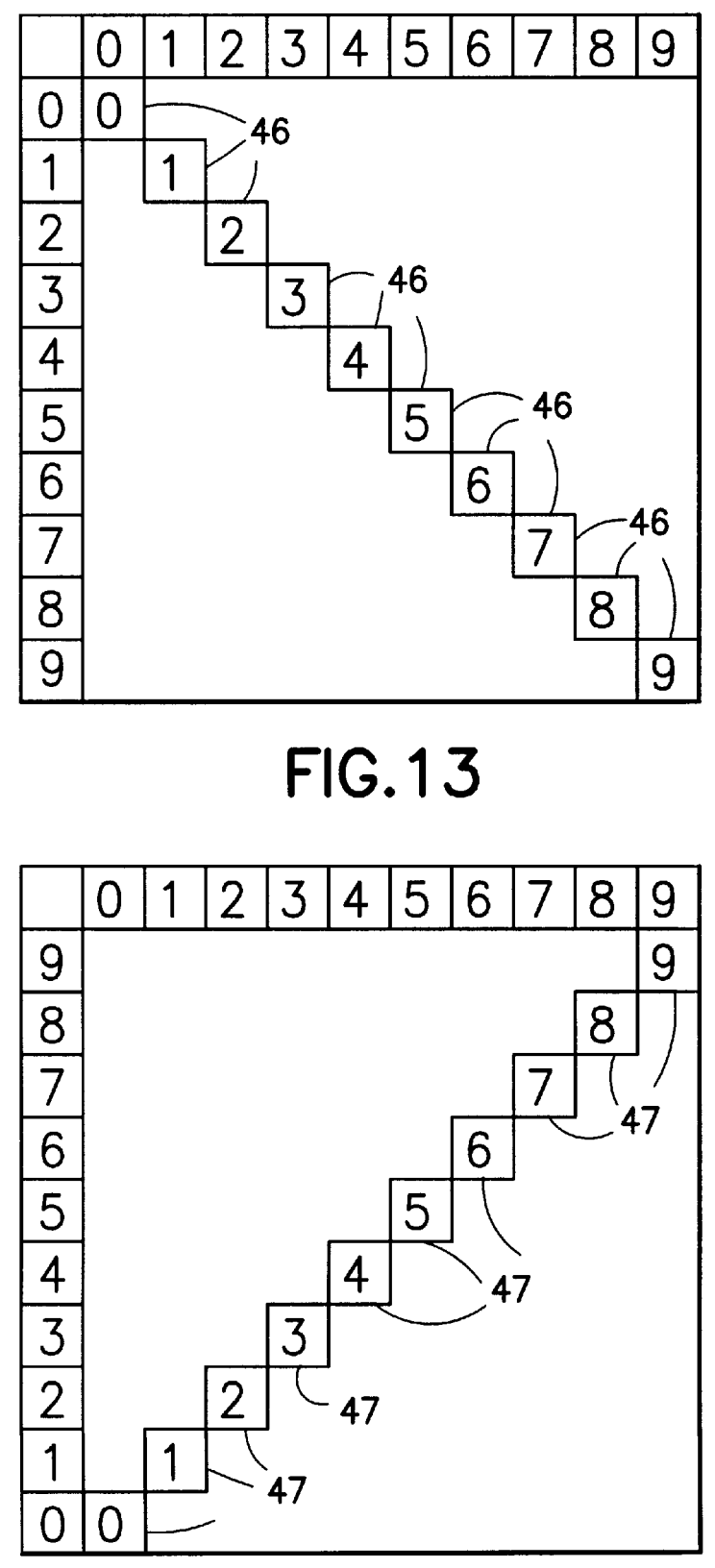

FIG. 14 is a view, corresponding to FIG. 13, showing the address reference table of the information exchange code main memory in the case shown in FIG. 10. In this case, 10 bits 0, 1, 2, 3, 4, 5, 6, 7, 8 and 9 of the row index are arranged backward from 9 to 0 from the top.

FIG. 15, corresponding to the address reference table (34) shown in FIG. 9 wherein both of the column index and the row index are arranged from "0" to "9", shows an address reference table displaying capital letters and small letters in the alphabet (Latin letters).

As for the address reference table (34) (displaying katakana (the square phonetic Japanese syllabary)) of the information exchange code main memory, it can be applied to plural languages such as Japanese, English, French, German, Italian, Chinese and so on. The plural number of reference tables (34) can be memorized in one system, and one of the reference tables (34) can be displayed in the reference table display (57) according to its necessity.

FIG. 16 is a view for explaining in detail what is claimed in claim 1 and claim 2. As for the kana input device, Japanese Industrial Standard (JIS) keyboard, new JIS keyboard, OASIS keyboard, a keyboard having keys arranged in the order of the Japanese syllabary, and the like can be conventionally used, and as for the alphanumeric input device, ASCII keyboard etc. can be conventionally used. However, in such a conventional manner, one character is assigned to each of codes, so the keyboard includes a considerable number of keys, which increases the size of the keyboard.

According to the input device of the present invention, all characters and symbols can be inputted using only numeric keys. When an arbitrary numeral is inputted through the input keyboard, the arbitrary numeral in the column index preferentially specifies a column which corresponds to the inputted arbitrary numeral, and the column is inputted and held in an ON state. The column is simultaneously displayed on the selected character confirmation display (48) (for example, if "7" is selected, a column of characters "A, B, C, D, E, F, G, 7, H and I" is indicated.) Next, when another arbitrary numeral is inputted through input keyboard (10), the numeral in the row index specifies a row which corresponds to the inputted numeral, and the row is inputted (if "0" is selected, a row of characters "0, □, ゃ, ゃ, ュ, ョ, □, A, J and S" is inputted). Then, only a character at intersection of the previously specified column and the row is determined in an ON state (a character "A" (45) in this case), and the others are turned off.

Thus, characters can be retrieved and determined based on a column or a row of characters displayed on the selected character confirmation display (48) by using only numeric keys 0, 1, 2, 3, 4, 5, 6, 7, 8 and 9.

Figure 17:
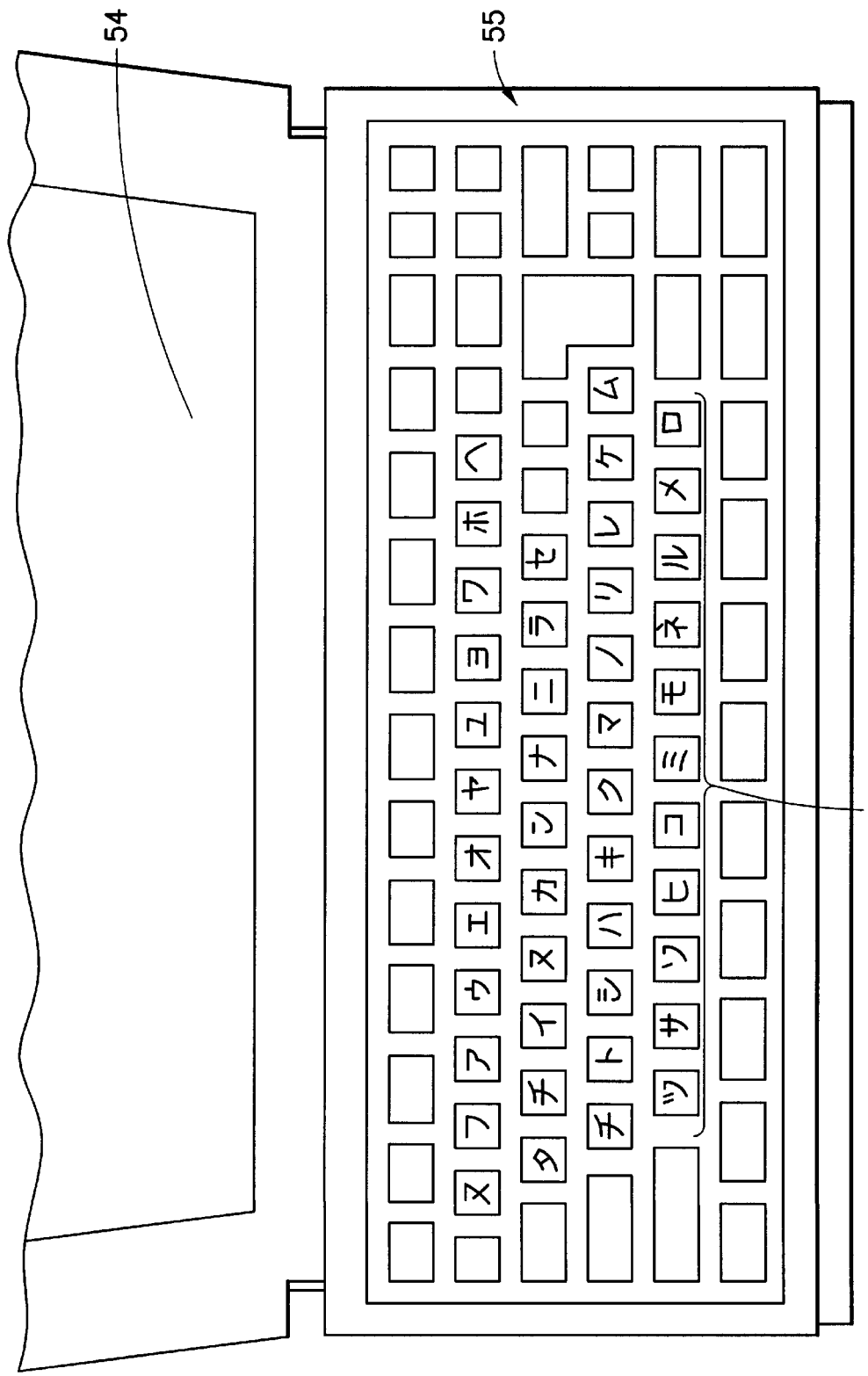
FIG. 17 is a view showing an input device of a conventional Japanese Industrial Standard (JIS) keyboard in a personal computer based on laptop system.

FIG. 17 is a view showing an input device of a JIS keyboard in a personal computer based on laptop system.

As shown in the figure, a body (55) of a personal computer based on laptop system having a conventional JIS keyboard (53), the keyboard (53) occupies a sizable proportion of the body, besides, keys need to be operated with both hands.

Figure 18:
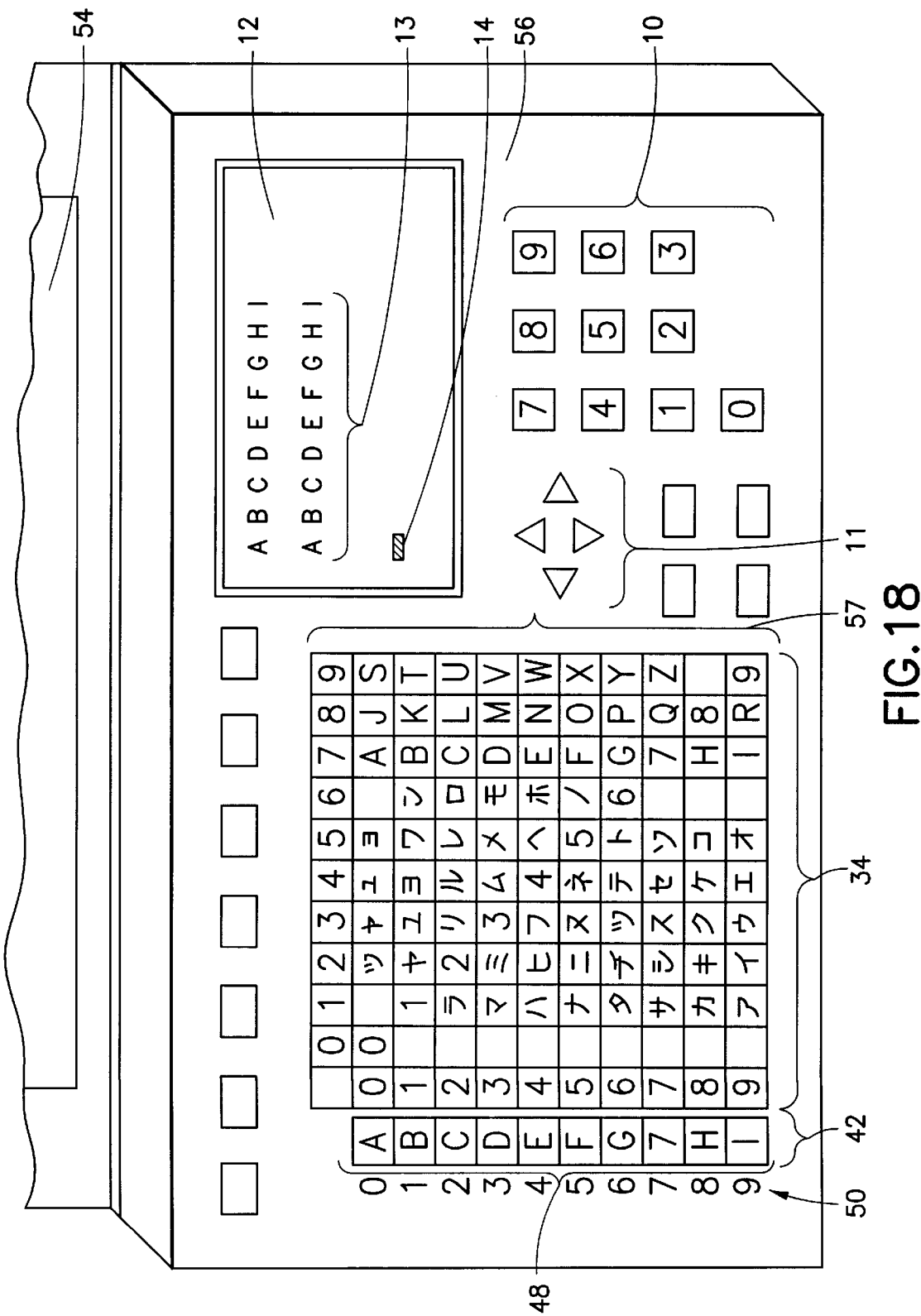
FIG. 18 is a view showing a personal computer based on lap top system in which the input device (the input device recited in claim 1, also recited in claims 2 and 4) of the present invention is mounted, wherein the reference table display (57) for displaying the address reference table (34) of the information exchange code main memory is arranged.

FIG. 18 is a view showing a personal computer on laptop system in which the input device (the input device recited in claim 1, also recited in claims 2 and 4) of the present invention is mounted.

As shown in the figure, the reference table display (57) recited in claim 4 for displaying the address reference table (34) of the information exchange code main memory is mounted on a body (56) of the personal computer.

When an arbitrary numeral (e.g. "7" in this case) is inputted through the input keyboard (10) with reference to the address reference table (34) on the reference table display (57), a column of characters "A, B, C, D, E, F, G, 7, H and I" that corresponds to the inputted numeral "7" is first inputted preferentially, held in an ON state, and it is simultaneously displayed on a selected character confirmation display (48). Next, when another arbitrary numeral (e.g. "0" in this case) is inputted, a corresponding row of characters "0, □, ゃ, ゃ, ュ, ョ, □, A, J and S" is inputted, and the character at intersection of the column and the row ("A" (45) in this case) is definitely in an ON state, and the others are turned off.

As described above, all characters and symbols can be easily inputted using only numeric keys with one hand.

Concentrating eyes on only the LCD (54), eye fatigue is increased, which may cause various kinds of diseases. In order to solve this problem, the above-mentioned personal computer (56) comprises LCD operation panel (12) as well as LCD (54), which makes it easier to transform or scale characters. Thereby, eye fatigue can be reduced.

Figure 19:
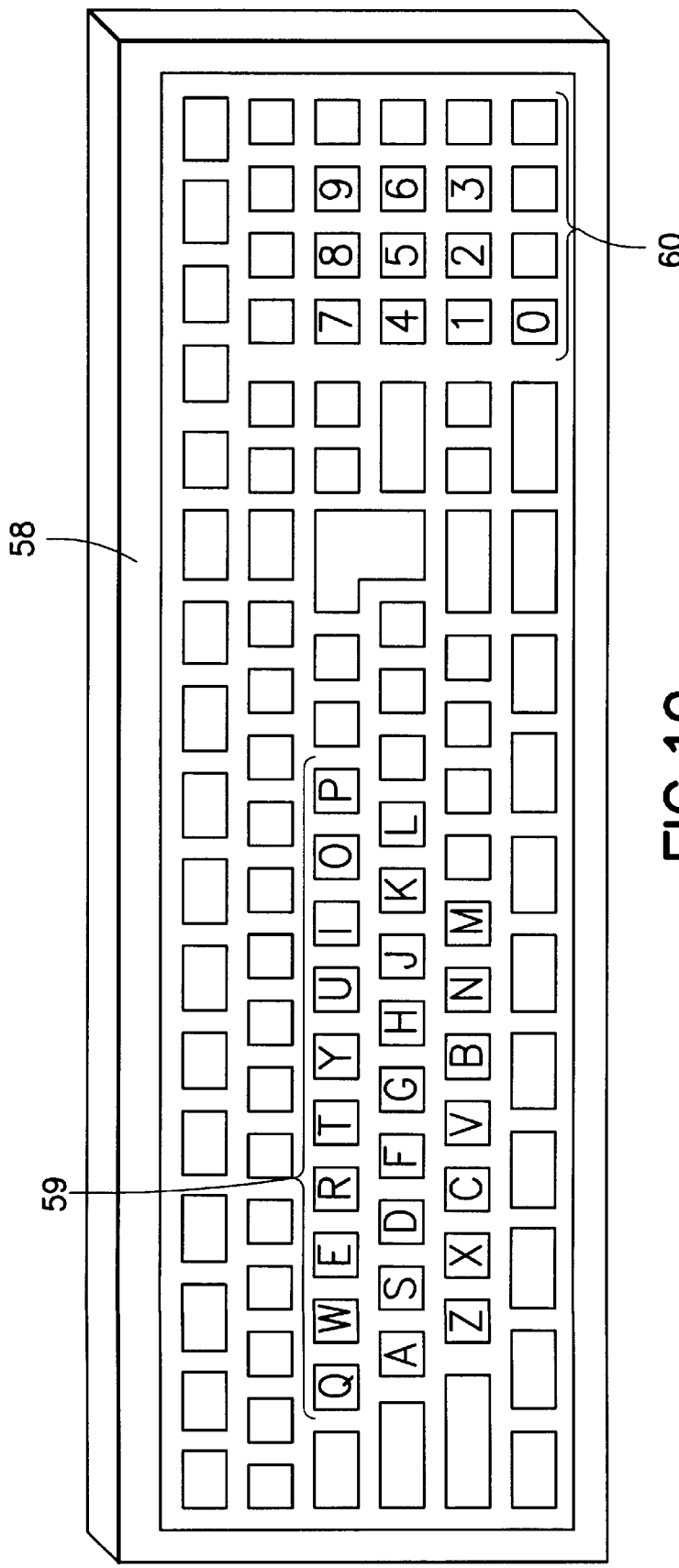
FIG. 19 is a view showing a conventional keyboard of a person computer for alphanumeric input in which alphabet (Latin letters) keys are arranged.

FIG. 19 is a view showing a conventional keyboard (58) for alphanumeric input in which alphabet (Latin letters) keys (59) and numeric keys (60) are arranged. In such a conventional manner, it is difficult for beginners to operate the keys, and requires a considerable effort.

Figure 20:
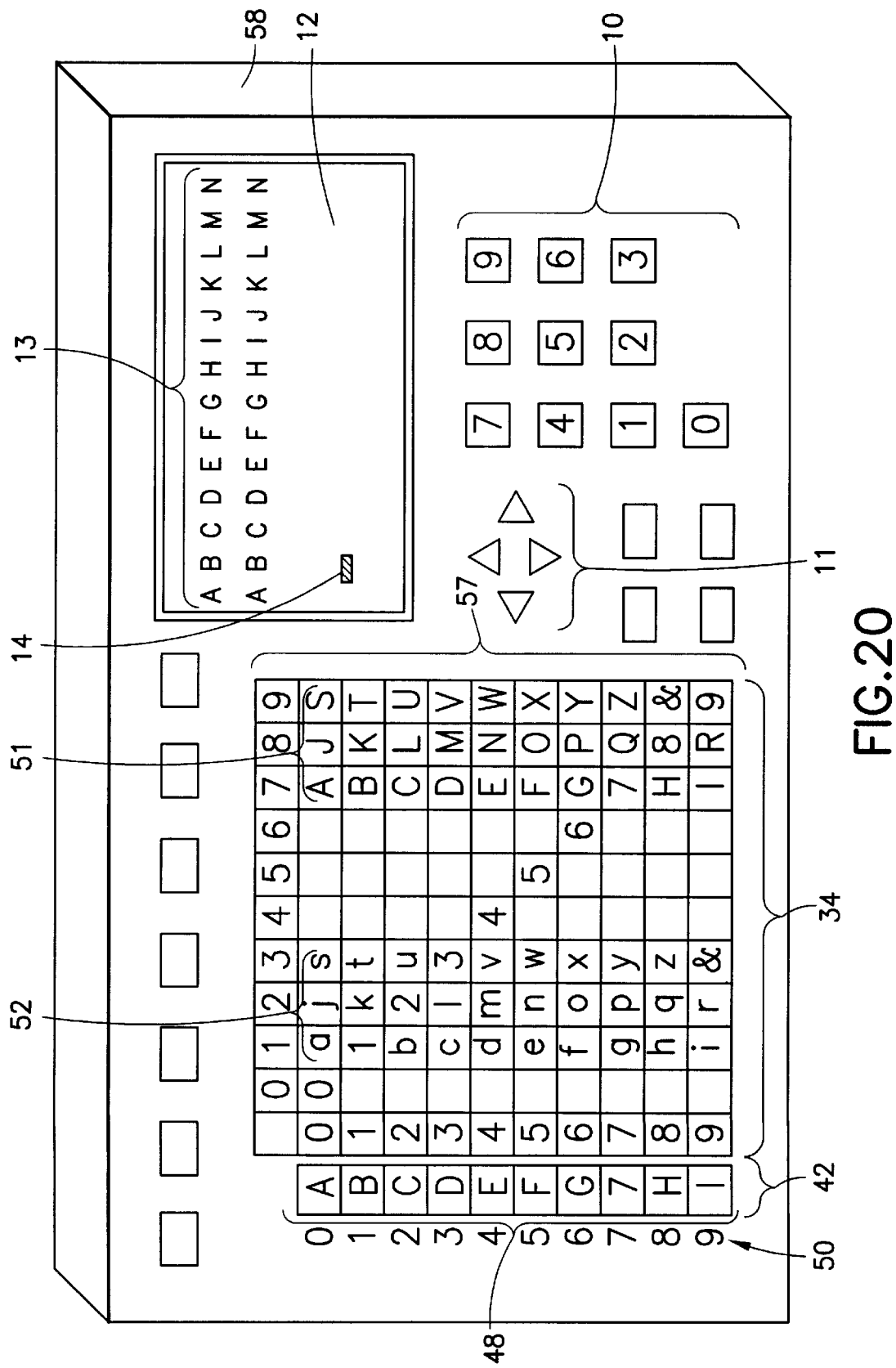
FIG. 20 is a view showing a keyboard (58) of a personal computer for alphanumeric input in which the input device (the input device recited in claim 1, also recited in claims 2 and 4) of the present invention is mounted, wherein the reference table display (57) for displaying the address reference table (34) (FIG. 15) (for displaying the alphabet (Latin letters)) of the information exchange code main memory, as recited in claim 4 is arranged.

FIG. 20 is a view showing a personal computer having a keyboard (58) for alphanumeric input in which the input device (the input device recited in claim 1, also recited in claims 2 and 4) comprising the reference table display (57) recited in claim 4 for displaying the address reference table (FIG. 15) (for displaying the alphabet (Latin letters)) of the present invention is mounted. As explained previously with reference to FIG. 18, all characters and symbols can be inputted using only numeric keys, so beginners can operate the keys with one hand.

Figure 21:
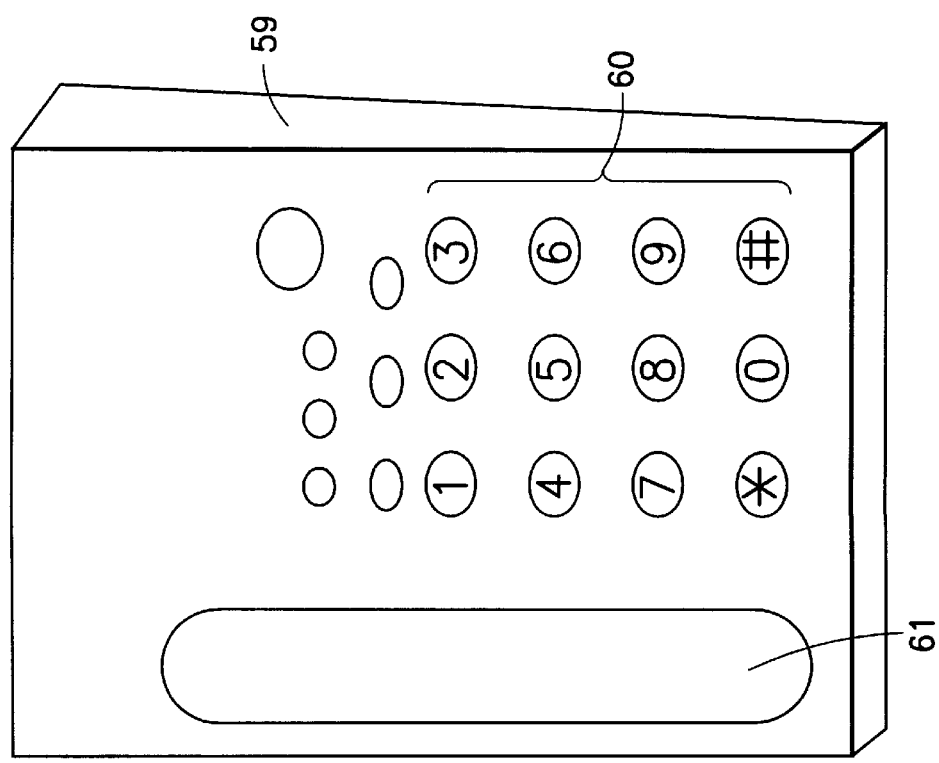
FIG. 21 is a view showing an input device in a conventional telephone.

FIG. 21 is a view showing an input device in a conventional telephone. In this kind of conventional telephone equipped with a phone-answering function, there has been a problem that it is hard to hear and understand a message by the voice-mail function.

Figure 22:
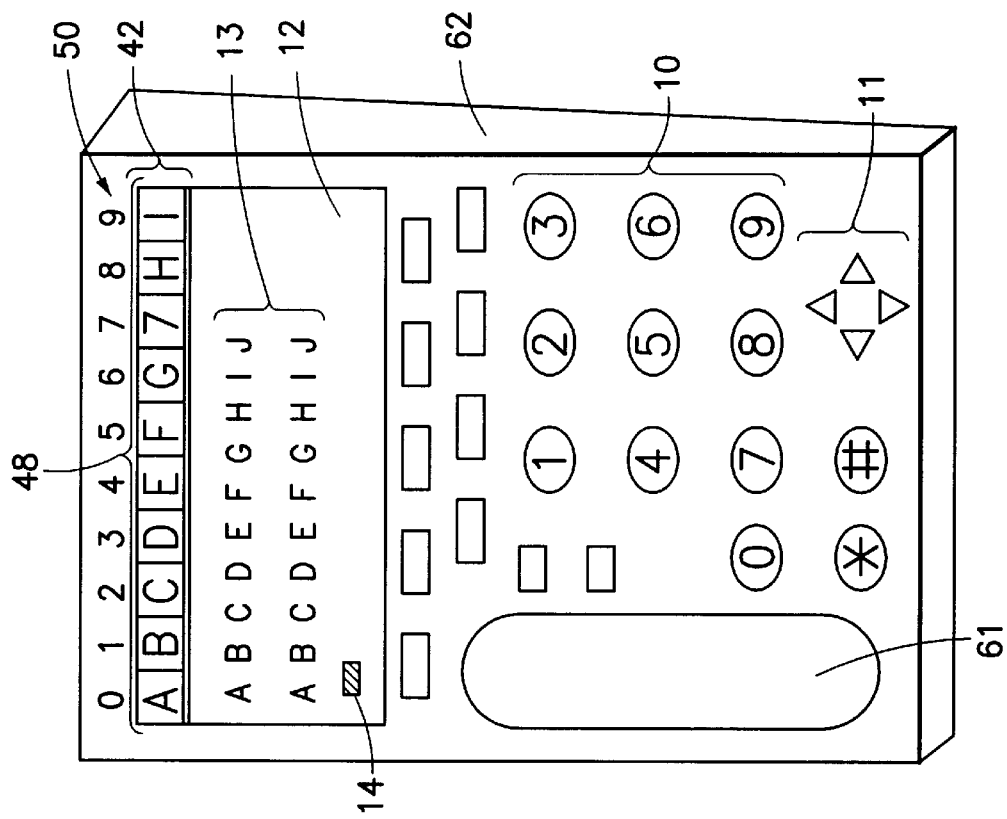
FIG. 22 is a view showing a telephone body (62) in which the input device (the input device recited in claim 1, also recited in claims 2 and 3) of the present invention is mounted.

FIG. 22 is a view showing a telephone in which the input device (the input device recited in claim 1, also recited in claims 2 and 3) of the present invention is mounted. In order to miniaturize the telephone body (62), the reference table display (57) recited in claim 4 for displaying the address reference table (34) is not arranged therein.

In addition to the phone-answering function and voice-mail function, the telephone in which the input device (the input device recited in claim 1, also recited in claims 2 and 3) of the present invention is mounted, has a function to record a caller's message. For example, even a deaf person can communicate with a person using only numeric keys.

Moreover, it is also possible to transmit a message consisting of arbitrary characters inputted through the above-mentioned input device to a pager unit or another telephone.

Figure 23:
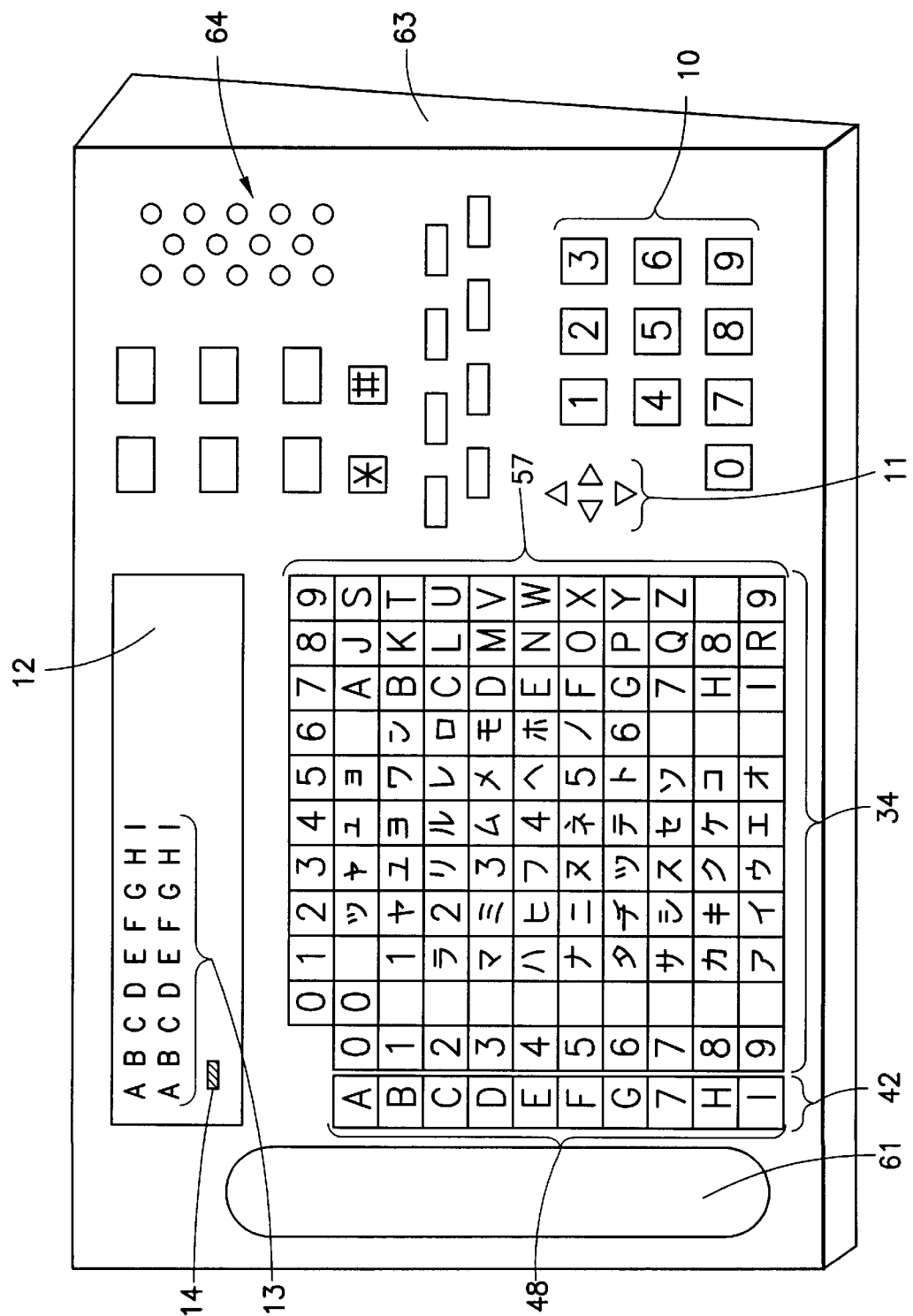
FIG. 23 is a view showing a telephone in which the input device (the input device recited in claim 1, also recited in claims 2 and 4) of the present invention is mounted according to a modified embodiment of the case shown in FIG. 22, wherein the reference table display (57) for displaying the address reference table (34) of the information exchange code main memory is arranged.

FIG. 23 is a view showing a telephone body (63) in which the input device (the input device recited in claim 1, also recited in claims 2 and 4) of the present invention is mounted.

The reference table display (57) recited in claim 4 for displaying the address reference table (34) of the information exchange code main memory is mounted on the telephone body (63).

In this telephone, it is also possible to transmit a message consisting of arbitrary characters inputted through the above-mentioned input device to a pager unit or another telephone.

Figure 24:
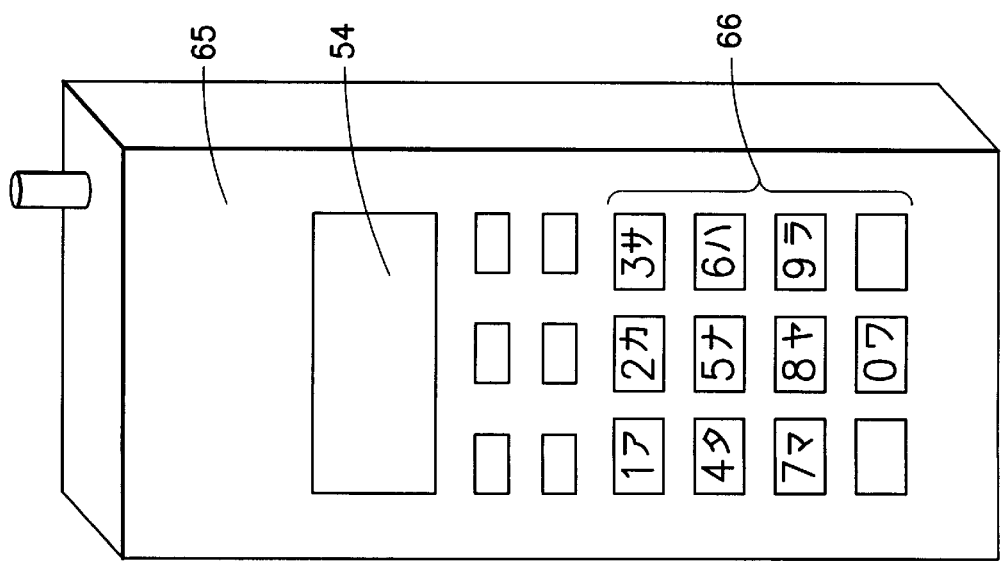
FIG. 24 is a view showing an input device in a conventional portable telephone.

FIG. 24 is a view showing an input device in a conventional portable telephone. Since plural characters are arranged in each of keys (66) (for example, characters "ア, イ, ウ, エ, and オ" are memorized in the key "1", and a character is changed every time the key is pushed), it is troublesome to repeat a operation in order to input a character.

Figure 25:
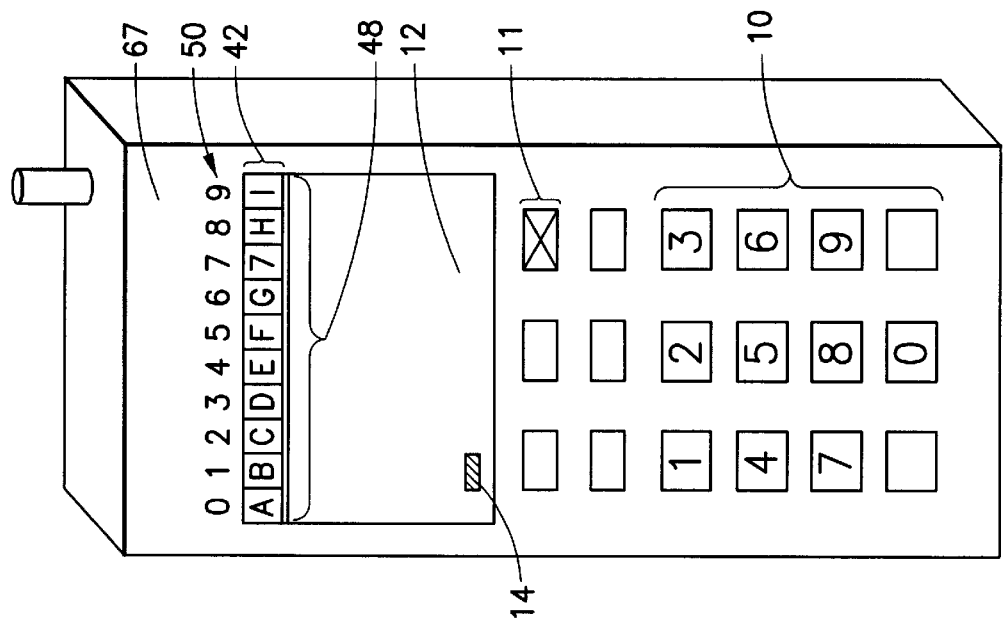
FIG. 25 is a view showing a portable telephone in which the input device (the input device recited in claim 1, also recited in claims 2 and 3) of the present invention is mounted.

FIG. 25 is a view showing a portable telephone in which the input device (the input device recited in claim 1, also recited in claims 2 and 3) of the present invention is mounted.

In order to miniaturize the telephone body (67), the reference table display (57) recited in claim 4 for displaying the address reference table (34) is not arranged therein.

In the portable telephone in which the input device (the input device recited in claim 1, also recited in claims 2 and 3) is mounted, it is possible to achieve one of the objects of inputting arbitrary characters voicelessly through the above-mentioned input device and transmit a message consisting of the arbitrary characters to another portable telephone and so on. The characters are inputted by a considerably simple key operation.

Figure 26:
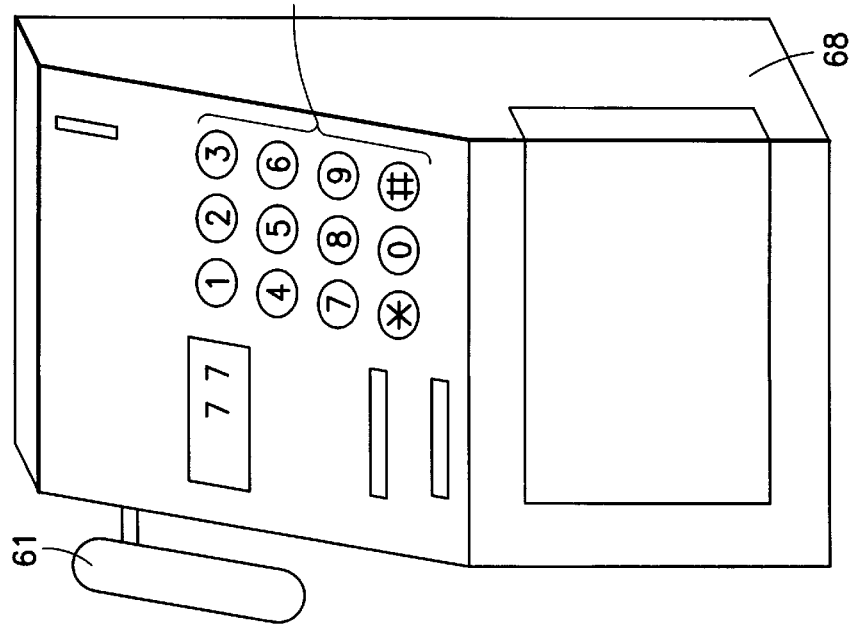
FIG. 26 is a view showing an input device in a conventional public telephone.

FIG. 26 is a view showing an input device in a conventional public telephone. In the conventional public telephone based only on a voice-communication system, there has been a problem of a long phone call, or misunderstanding of information.

Figure 27:
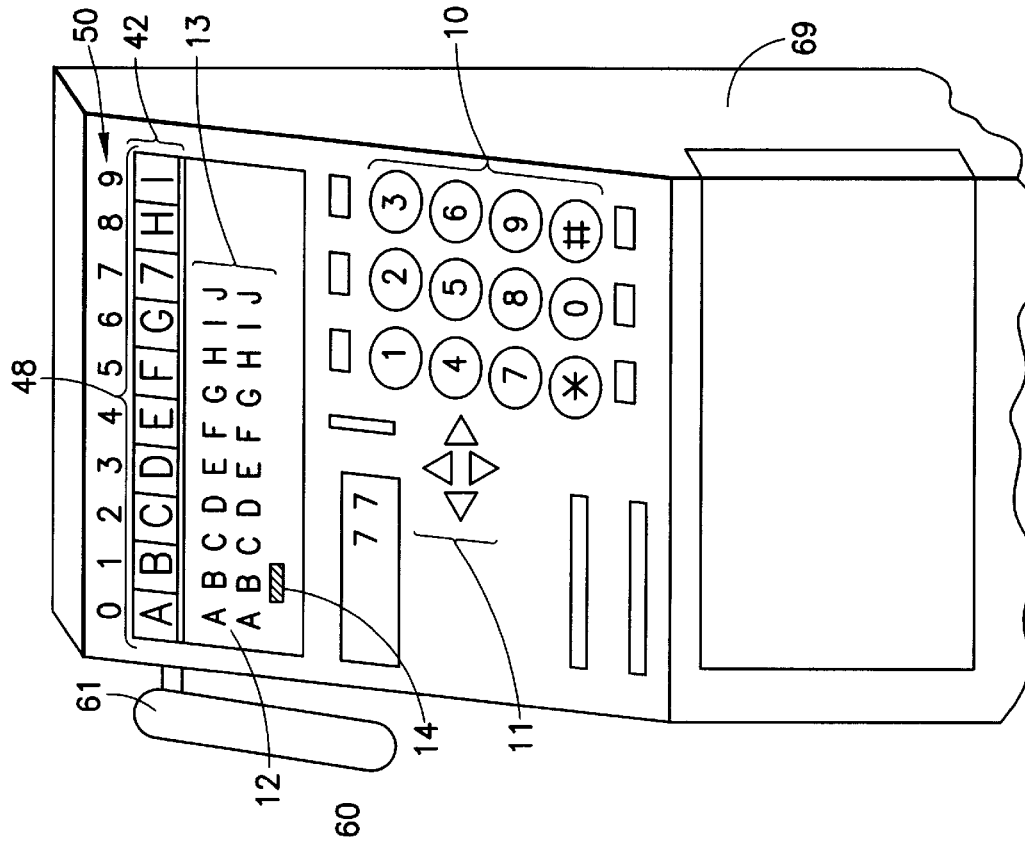
FIG. 27 is a view showing a public telephone in which the input device (the input device recited in claim 1, also recited in claims 2 and 4) of the present invention is mounted.

FIG. 27 is a view showing a public telephone in which the input device (the input device recited in claim 1, also recited in claims 2 and 4) of the present invention is mounted.

The reference table display (57) recited in claim 4 for displaying the address reference table (34) is not arranged in order to miniaturize a body (69) thereof.

In said public telephone, characters are easily inputted using only numeric keys, and besides, a message consisting of the characters is directly displayed on a LCD of a receiving telephone or a pager unit, so the message can be correctly transmitted.

Figure 28:
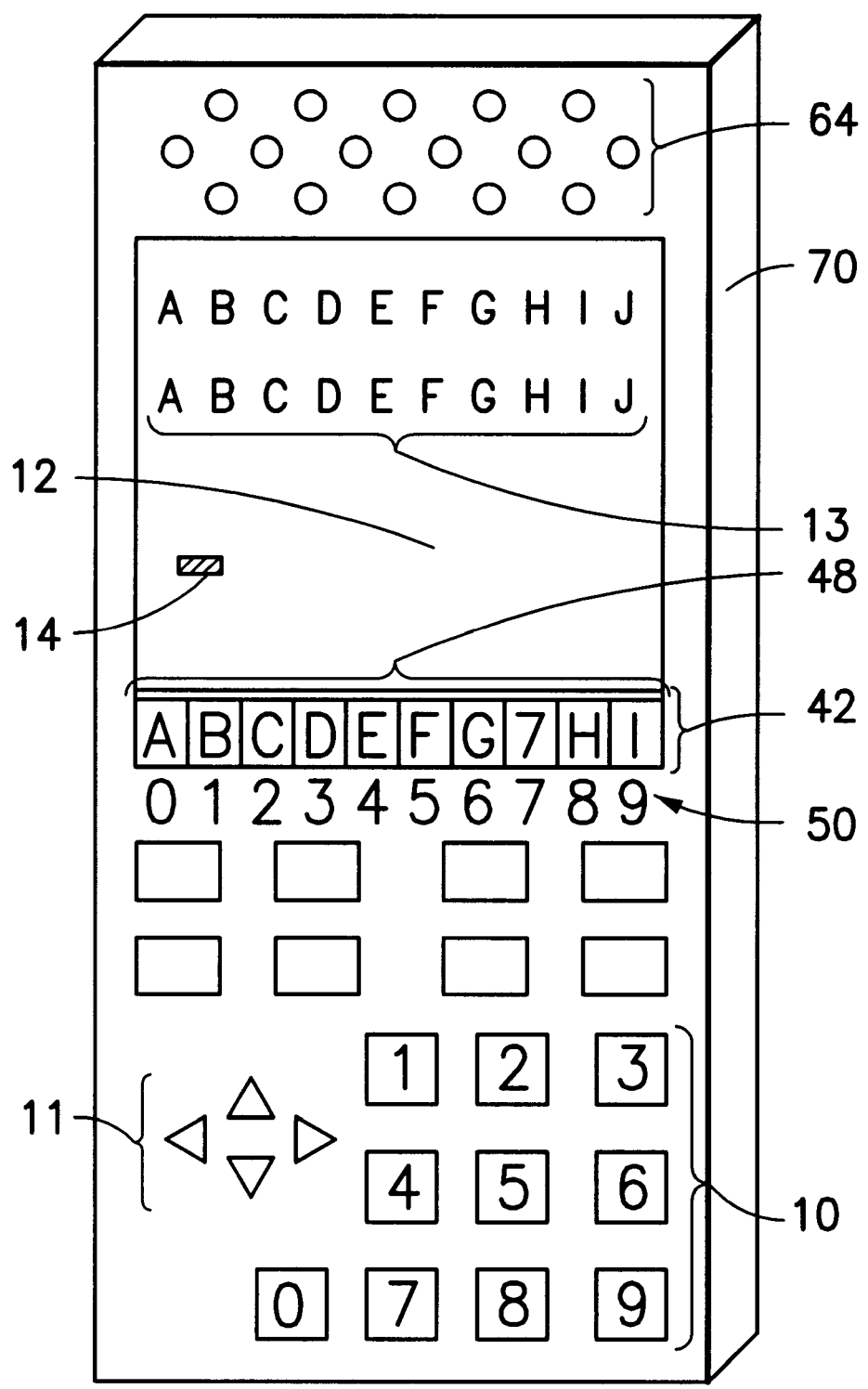
FIG. 28 is a view showing a conversation apparatus for handicapped people (mainly the blind, deaf, or dumb) in which the input device (the input device recited in claim 1, also recited in claims 2 and 4) of the present invention is mounted.

FIG. 28 is a view showing a conversation apparatus for handicapped people (mainly the blind, deaf, or dumb) in which the input device (the input device recited in claim 1, also recited in claims 2 and 4) of the present invention is mounted.

The conversation apparatus is not equipped with the reference table display (57) recited in claim 4 for displaying the address reference table (34) in order to miniaturize a body (70) thereof.

This is the conversation apparatus for the blind, deaf or dumb to communicate with other people.

Characters can be easily inputted using only numeric keys, besides, a message consisting of the characters can be directly transmitted and displayed on a LCD of a receiving telephone. Moreover, the message can be converted into voice output.

Figure 29:
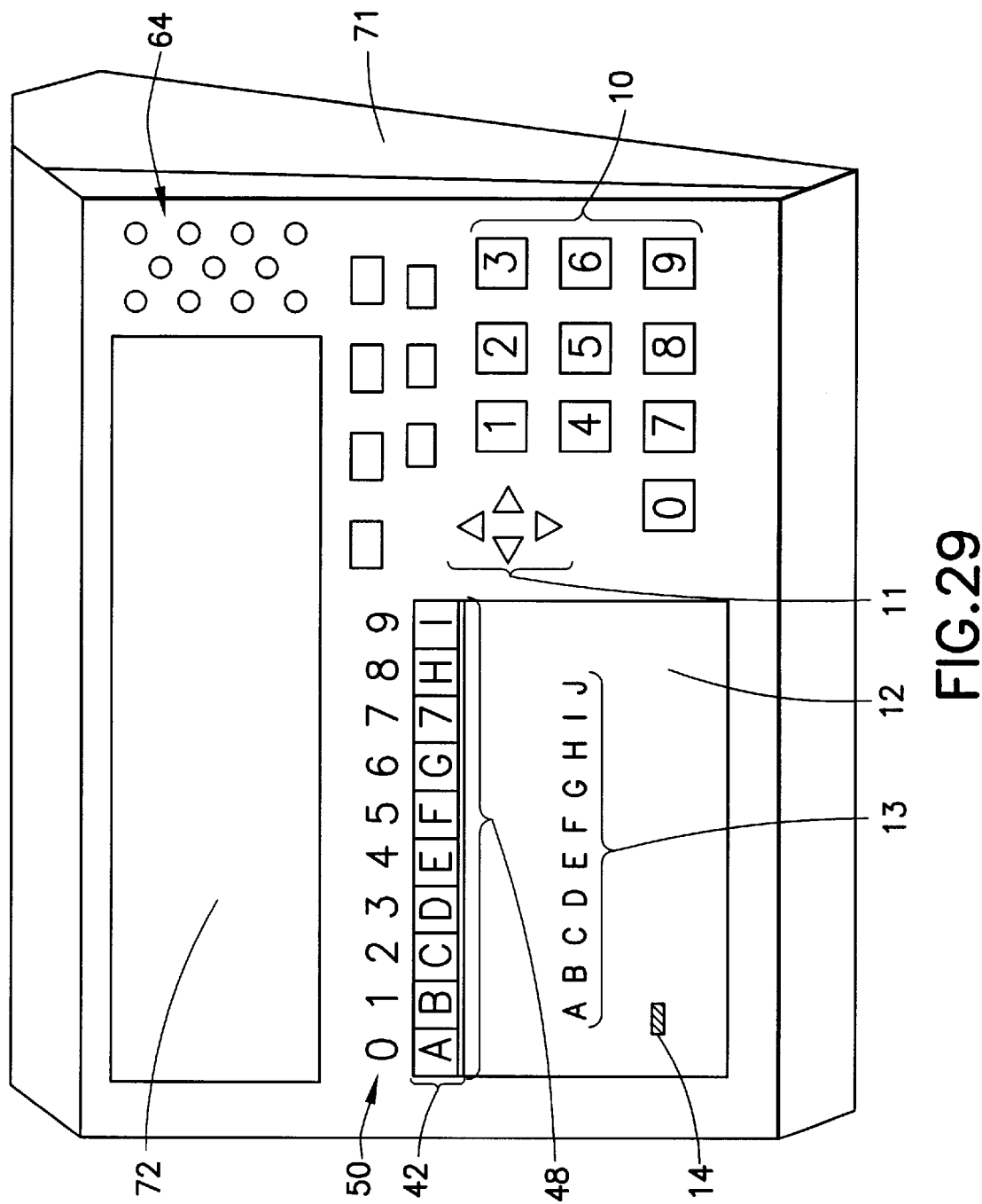
FIG. 29 is a view showing a dictionary/translation apparatus in which the input device (the input device recited in claim 1, also recited in claims 2 and 4) of the present invention is mounted.

FIG. 29 shows a dictionary/translation apparatus in which the input device (the input device recited in claim 1, also recited in claims 2 and 4) of the present invention is mounted.

A body (71) of said dictionary/translation apparatus is not equipped with the reference table display (57) for displaying the address reference table (34) in order to enlarge space for a LCD (72) which displays the pronunciation and meaning of a word, and a LCD operation panel (12). (It is possible to arrange the address reference table (34) on the LCD (72) or the LCD operation panel (12)). In a conventional dictionary/translation apparatus, alphanumeric keys are arranged in the input keyboard, so a keyboard occupies a sizable proportion of a body thereof. However, characters can be inputted using only numeric keys in the dictionary/translation apparatus applying the input device of the present invention, so the space for the input keyboard (10) can be reduced.

Figure 30:
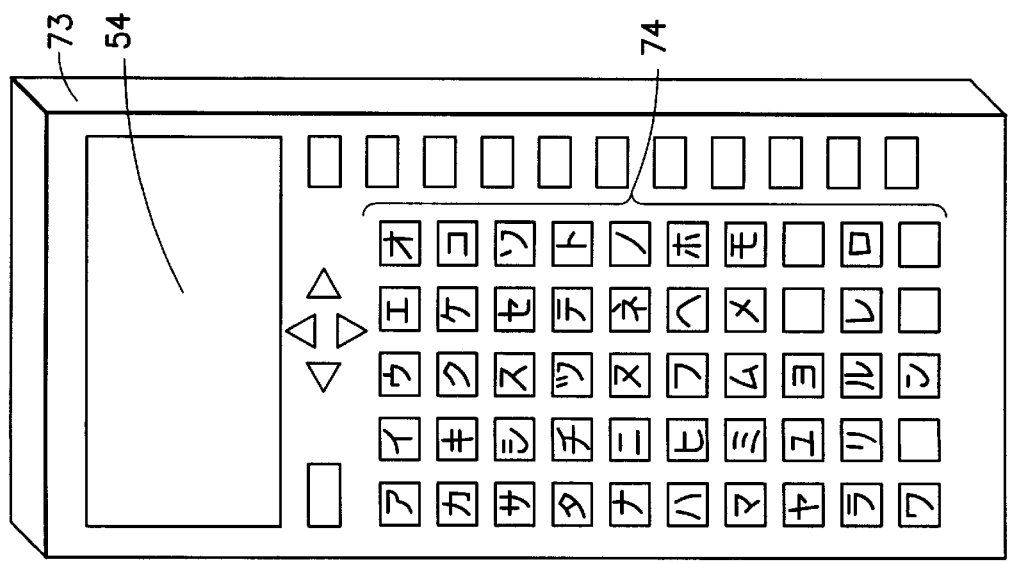
FIG. 30 is a view showing an input device in a conventional electronic diary in which katakana (the square phonetic Japanese syllabary) keys are arranged in the order of the Japanese syllabary.

FIG. 30 is a view showing an input device in a conventional electronic diary in which katakana (the square phonetic Japanese syllabary) input keys are arranged in the order of the Japanese syllabary.

In a body (73) of a conventional electronic diary, a keyboard (74) consisting of katakana input keys arranged in the order of the Japanese syllabary occupies a sizable proportion thereof, therefore, space for a LCD (54) is limited, and the restricted characters are displayed on the LCD (54).

Figure 31:
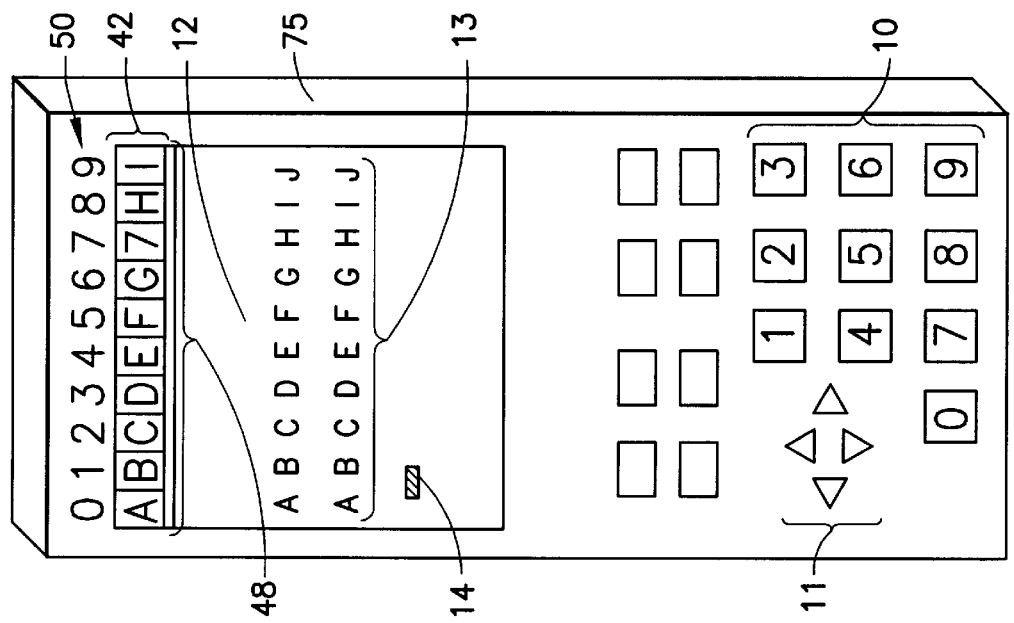
FIG. 31 is a view showing an electronic diary in which the input device (the input device recited in claim 1, also recited in claims 2 and 4) of the present invention is mounted.

FIG. 31 is a view showing an electronic diary in which the input device (the input device recited in claim 1, also recited in claims 2 and 4) of the present invention is mounted.

A body (75) is not equipped with the reference table display (57) recited in claim 4 for displaying the address reference table (34) in order to enlarge a LCD operation panel (12). The LCD operation panel (12) for displaying characters and symbols which are inputted through only numeric keys, is arranged, so it is possible to display a name and an address in full.

Figure 32:
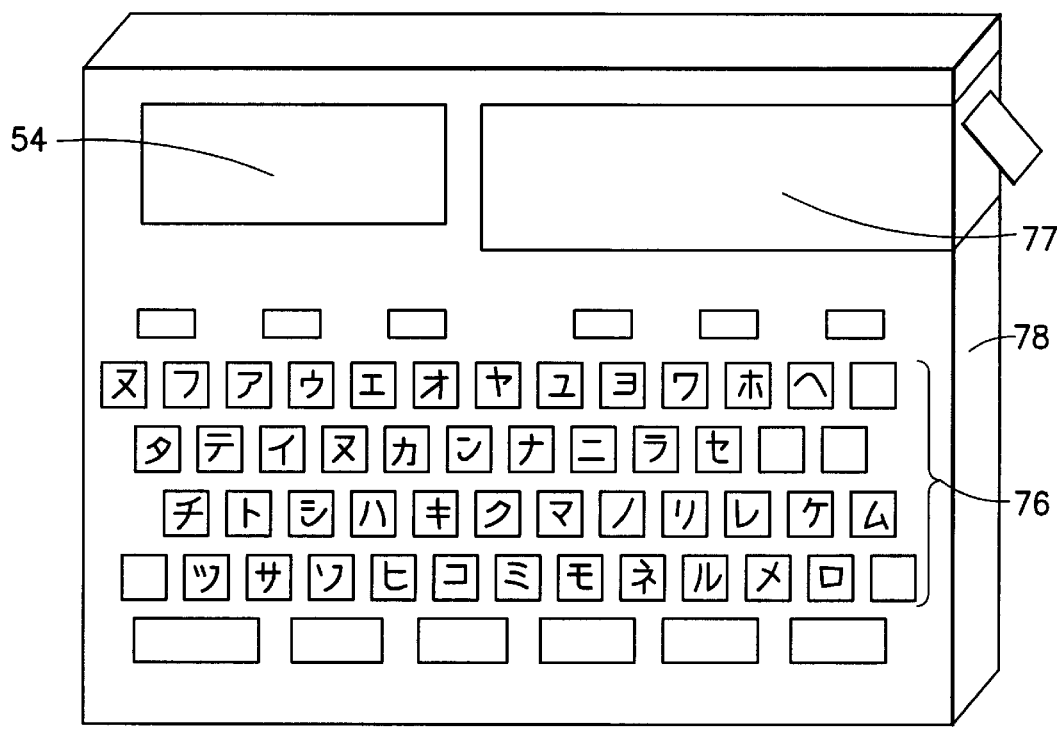
FIG. 32 is a view showing an input device in a word processor having a JIS keyboard for printing on a tape or a label.

FIG. 32 shows a word processor having a JIS keyboard (76) for printing on a tape or a label. As shown in the figure, the JIS keyboard (76) occupies a sizable proportion of a body (78) thereof, so space for a LCD (54) and a tape cartridge chamber (77) is reduced.

Figure 33:
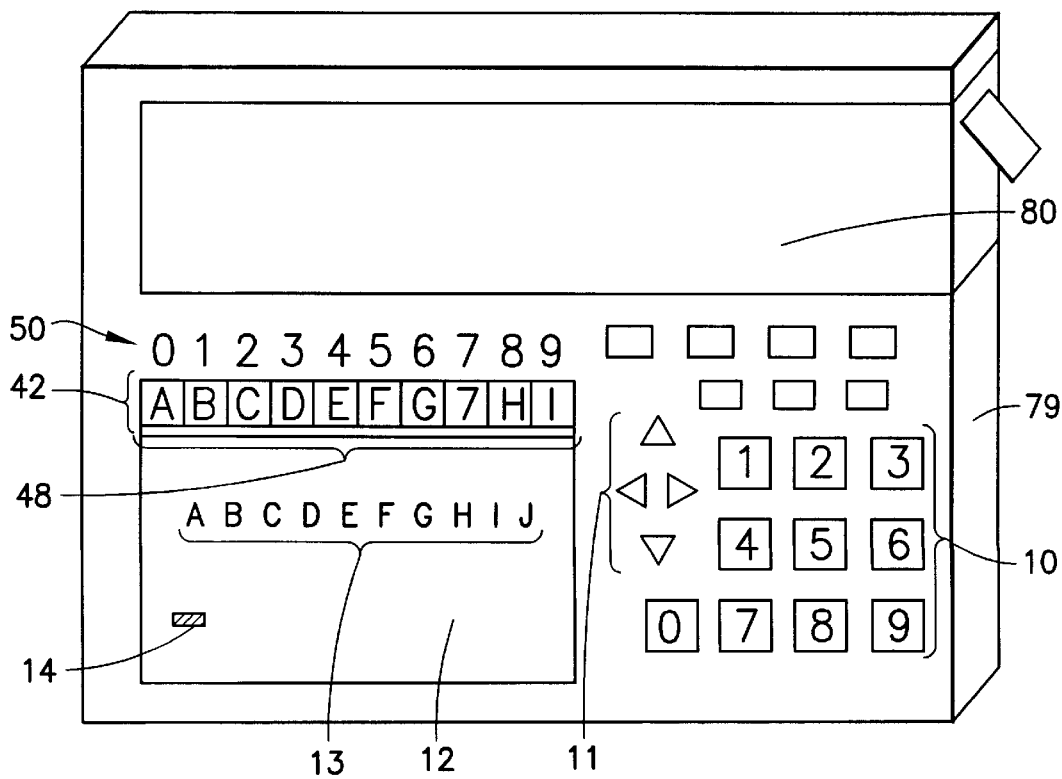
FIG. 33 is a view showing a word processor for printing on a tape or a label in which the input device (the input device recited in claim 1, also recited in claims 2 and 4) of the present invention is mounted.

FIG. 33 is a view showing a word processor for printing on a tape or a label, in which the input device (the input device recited in claim 1, also recited in claims 2 and 4) of the present invention is mounted.

The reference table display (57) recited in claim 4 for displaying the address reference table (34) is not arranged in order to enlarge a LCD operation panel (12) and a tape cartridge chamber in a word processor body (79).

It is also possible to mount the input device (the input device recited in claim 1, also recited in claims 2 and 4) in the similar product, a word processor for printing on a post card or a card.

The present invention as described above provides an apparatus for recording photographing information on a frame of a film, all characters and symbols can be inputted through only numeric keys, and exposed on any portion of the frame of the film. Arbitrary characters and symbols are easily inputted through a combination of numeric keys 0, 1, 2, 3, 4, 5, 6, 7, 8 and 9 of an input keyboard. Moreover, the input device of the present invention can be mounted to various kinds of electronic products such as telephone, portable telephone, conversation apparatus for handicapped people (mainly the blind, deaf, or dumb), dictionary/translation apparatus, electronic diary and some products such as personal computer for converting figures into characters. The address reference table (34 in FIG. 9) of the information exchange code main memory can be applied to various kinds of languages. Having described preferred embodiments of the invention with reference to the accompanying drawings, it is to be understood that the invention is not limited to those precise embodiments, and the various changes and modifications may be effected therein by one skilled in the art without departing from the scope or spirit of the invention as defined in the appended claims.

What is claimed is:

1. An input device for inputting characters and symbols comprising:

an information exchange code main memory having a column index and a row index said information exchange code main memory effective for memorizing an address reference table;

said column index having 10 bits;

said column index effective to select a column of said address reference table;

said row index having 10 bits;

said row index effective to select a row of said address reference table;

an input keyboard for alternately inputting said column index and said row index;

a means for inputting a first input thereby producing a first index;

said first index effective to select one of said column and said row of said address reference table, and holding said one of said selected column and row in an ON state;

a selected character confirmation display for displaying said one of said column and said row selected by said means for inputting, whereby said selected one of said column and said row is displayed on said selected character confirmation display;

a means for inputting a second input thereby producing a second index;

said second index effective to select another of said one of said column and said row of said address reference table, thereby determining a first selected character at an intersection of said selected column and said selected row;

said first selected character being displayed on said selected character confirmation display;

said information exchange code main memory having means to memorize said address reference table;

means for canceling one of said input of said first index and said second index, such that one of said column and said row of said address reference table, corresponding to another of said input of said first index and said second index, remains in an ON state, whereby said one of said row and said column of said address reference table in said ON state is displayed on said selected character confirmation display; and means for inputting an index effective to replace said canceled one of said input of said first index and said second index resulting from said means for canceling, whereby said index selects a second character corresponding to an intersection of said selected column and said selected row, and said second selected character being displayed on said selected character confirmation display.

2. An input device as in claim 1, further comprising:

a central processing unit for controlling operations of said device;

each of said 10 bits of said column corresponding to first 5 digit binary numbers, said first 5 digit binary numbers being held in a first memory;

each of said 10 bits of said row index corresponding to second 5 digit binary numbers, said second 5 digit binary numbers being held in a second memory;

said central processing unit effective to evaluate said first 5 digit binary numbers and convert said first 5 digit binary numbers into first decimal numbers such that said central processing unit produces a signal for selecting a column of said address reference table corresponding to said first decimal number; and said central processing unit also effective to evaluate said second 5 digit binary numbers and convert said second 5 digit binary numbers into second decimal numbers such that said central processing unit produces a signal for selecting a row of said address reference table corresponding to said second decimal number.

3. An input device as in claim 1 further comprising:

a second address reference table displayed on said reference table display;

said second address reference table for displaying the address reference table being memorized in said information exchange code main memory.

4. An apparatus for recording characters and symbols on a camera film frame having an input device as in claim 1, said apparatus comprising:

a bitmap display having a line of characters and symbols, effective to expose said camera film frame in a bitmap display exposure zone on a spool chamber side of said camera film frame; and a press plate provided with said bitmap display and pressed onto a film, whereby said line of characters and symbols inputted by said input device, are displayed on said bitmap display such that said film is exposed by said characters and symbols.

5. An apparatus as in claim 4, wherein said bitmap display covers essentially an entire surface of said press plate.

6. An apparatus for recording characters and symbols on a camera film frame having an input device as in claim 1, said apparatus comprising:

a bitmap display having a line of characters and symbols, effective to expose said camera film frame in a bitmap display exposure zone on a spool chamber side of said camera film frame; and a press plate provided with said bitmap display and pressed onto a film, whereby said line of characters and symbols inputted by said input device, are displayed on said bitmap display such that said film is exposed by said characters and symbols.

7. An apparatus as in claim 6, wherein said bitmap display covers essentially an entire surface of said press plate.

* * * * *